US007962447B2

(12) United States Patent
Chen et al.

(10) Patent No.: US 7,962,447 B2
(45) Date of Patent: Jun. 14, 2011

(54) ACCESSING A HIERARCHICAL DATABASE USING SERVICE DATA OBJECTS (SDO) VIA A DATA ACCESS SERVICE (DAS)

(75) Inventors: Shawfu Chen, New Milford, CT (US); Adris E. Hoyos, Poughkeepsie, NY (US); Kevin T. Jones, Poughkeepsie, NY (US); Bernard Klos, Victor, NY (US); Aleksandr Krymer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 12/346,687

(22) Filed: Dec. 30, 2008

(65) Prior Publication Data
US 2010/0169275 A1    Jul. 1, 2010

(51) Int. Cl.
*G06F 17/00*    (2006.01)
*G06F 7/00*    (2006.01)
(52) U.S. Cl. ........................................ 707/610; 707/803
(58) Field of Classification Search ............... 707/999.1, 707/610, 803
See application file for complete search history.

(56) References Cited

U.S. PATENT DOCUMENTS

| 5,600,827 | A | * | 2/1997 | Nakabayashi et al. | ................. | 1/1 |
| 5,826,263 | A | * | 10/1998 | Nakabayashi et al. | ................. | 1/1 |
| 5,930,806 | A | * | 7/1999 | Taira et al. | ............................ | 1/1 |
| 6,535,869 | B1 | * | 3/2003 | Housel, III | .................... | 707/691 |
| 6,850,951 | B1 | * | 2/2005 | Davison | ....................... | 707/792 |
| RE40,187 | E | * | 3/2008 | Abraham et al. | ............. | 709/224 |
| 7,490,084 | B2 | * | 2/2009 | Kothuri et al. | ......................... | 1/1 |
| 2002/0184239 | A1 | * | 12/2002 | Mosher et al. | ................ | 707/200 |
| 2006/0074977 | A1 | * | 4/2006 | Kothuri et al. | ............ | 707/104.1 |
| 2007/0089117 | A1 | * | 4/2007 | Samson | ........................ | 719/330 |
| 2007/0294215 | A1 | * | 12/2007 | Boss et al. | ........................ | 707/2 |
| 2010/0082646 | A1 | * | 4/2010 | Meek et al. | ................... | 707/752 |

OTHER PUBLICATIONS

Resende, Luciano, et al., "Handling Heterogeneous Data Sources in a SOA Environment with Service Data Objects", SIGMOD '07, Beijing, China, Jun. 12-14, 2007, pp. 895-897.*

* cited by examiner

*Primary Examiner* — Robert Stevens
(74) *Attorney, Agent, or Firm* — Steven Chiu; Ido Tuchman

(57) ABSTRACT

Techniques for replicating modified data to a hierarchical database. A first list comprises records included in a set of records before at least one modification thereto. A second list comprises records included in the set of records after the at least one modification thereto. For each pre-modification record included in the first list and each post-modification record included in the second list having equal identifying values, a target record at the database and having a matching identifying value is modified. Specifically, if both records include corresponding indexes, information about a structure pointed to by the pre-modification record is removed from an index included in the target record, and information about a structure pointed to by the post-modification record is added to the index. If neither record includes an index, the target record is modified to contain at least one changed value included in the post-modification record.

20 Claims, 8 Drawing Sheets

ACCESSING A HIERARCHICAL DATABASE USING SERVICE DATA OBJECTS (SDO) VIA A DATA ACCESS SERVICE (DAS)

BACKGROUND OF THE INVENTION

1. Field of the Invention

The present invention relates generally to databases. More specifically, the present invention relates to techniques for replicating modified data to a hierarchical database.

2. Description of Background

A database is a system for storing and managing data. A database may store quantities of data which are potentially very large. Diverse types of data may be stored at the same database. In most databases, relationships between different elements of data stored at the database exist. Relationships may exist between data elements having different data types. To allow systems external to the database to access data located at the database, databases generally include functionality to process queries. A query is a request to retrieve specified data located at a database and to transmit the retrieved data to the entity which submitted the query.

The contents of a database need not be static. To the contrary, databases generally provide functionality to allow systems external to the database to modify the contents of the database. Modifications may include inserting new data, modifying existing data and deleting existing data.

Many databases known in the art organize data according to a hierarchical paradigm. A database organizing data in this manner is known as a hierarchical database. In a hierarchical database, parent-child relationships exist between different data elements stored at the database. A given data element may have a plurality of data elements as children. However, a given data element may have at most one data element as a parent. These parent-child relationships may define one or more tree structures. A data element may have a parent, a child, or both which is of a different data type.

The Service Data Objects (SDO) framework provides a unified framework for data application development. In particular, the SDO framework facilitates representing data using a tree structure. The SDO framework defines an entity known as a data graph. A data graph represents a database or another data source. The SDO framework additionally defines an entity known as a data object. A data object represents a specific unit of data. A data object may be included in a data graph, which may in turn arrange the data objects included therein into a tree structure. A data object generally has one or more properties which contain the data represented by the data object. A reference is a special type of property which links the data object in which it is contained to another data object. It is noted that references are included in the data graph due to being included in data objects which are included in the data graph. The references thus included in a data graph may define a tree structure within the data graph. A data graph includes functionality for tracking changes made to the data graph and to data objects contained thereby.

SUMMARY OF THE INVENTION

One aspect of the invention is a method for replicating modified data to a hierarchical database. The method comprises repeating a series of operations for each pre-modification record included in a first list and each post-modification record included in a second list for which the pre-modification record and the post-modification record have equal values for at least one unique identifier field. The first list comprises records included in a set of records before at least one modification to the set of records. The second list comprises records included in the set of records after the at least one modification to the set of records.

The series of operations comprises determining if the pre-modification record includes an index and the post-modification record includes an index corresponding to the same field as the index included in the pre-modification record. The series of operations further comprises removing information about a first structure pointed to by the pre-modification record from an index included in a target record if this condition holds. The target record is stored at the hierarchical database and has the same value as the post-modification record for the at least one unique identifier field. The series of operations further comprises adding information about a second structure pointed to by the post-modification record to the index included in the target record if this condition holds.

The series of operations further comprises determining if neither the pre-modification record nor the post-modification record includes an index. The series of operations further comprises modifying the target record so that the target record contains at least one value included in the post-modification record and not included in the pre-modification record if this condition holds. Modifying the target record is performed by a computer.

Another aspect of the invention is a system for replicating modified data to a hierarchical database. The system comprises a processor. The system further comprises a first list comprising pre-modification records included in a set of records before at least one modification to the set of records. The system further comprises a second list comprising post-modification records included in the set of records after the at least one modification to the set of records. The system further comprises a modifying unit. The modifying unit is configured to repeat the series of operations described above for each pre-modification record included in the first list and each post-modification record included in the second list for which the pre-modification record and the post-modification record have equal values for at least one unique identifier field.

Another aspect of the invention is a computer program product embodied in a computer usable medium. For example, the computer program product may include one or more tools for replicating modified data to a hierarchical database. Computer readable program codes are coupled to the computer usable medium and are configured to cause the program to repeat the series of operations described above for each pre-modification record included in a first list and each post-modification record included in a second list for which the pre-modification record and the post-modification record have equal values for at least one unique identifier field. The first list comprises records included in a set of records before at least one modification to the set of records. The second list comprises records included in the set of records after the at least one modification to the set of records.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention is described with reference to embodiments of the invention. Throughout the description of the invention reference is made to FIGS. 1-8.

Figure 1:
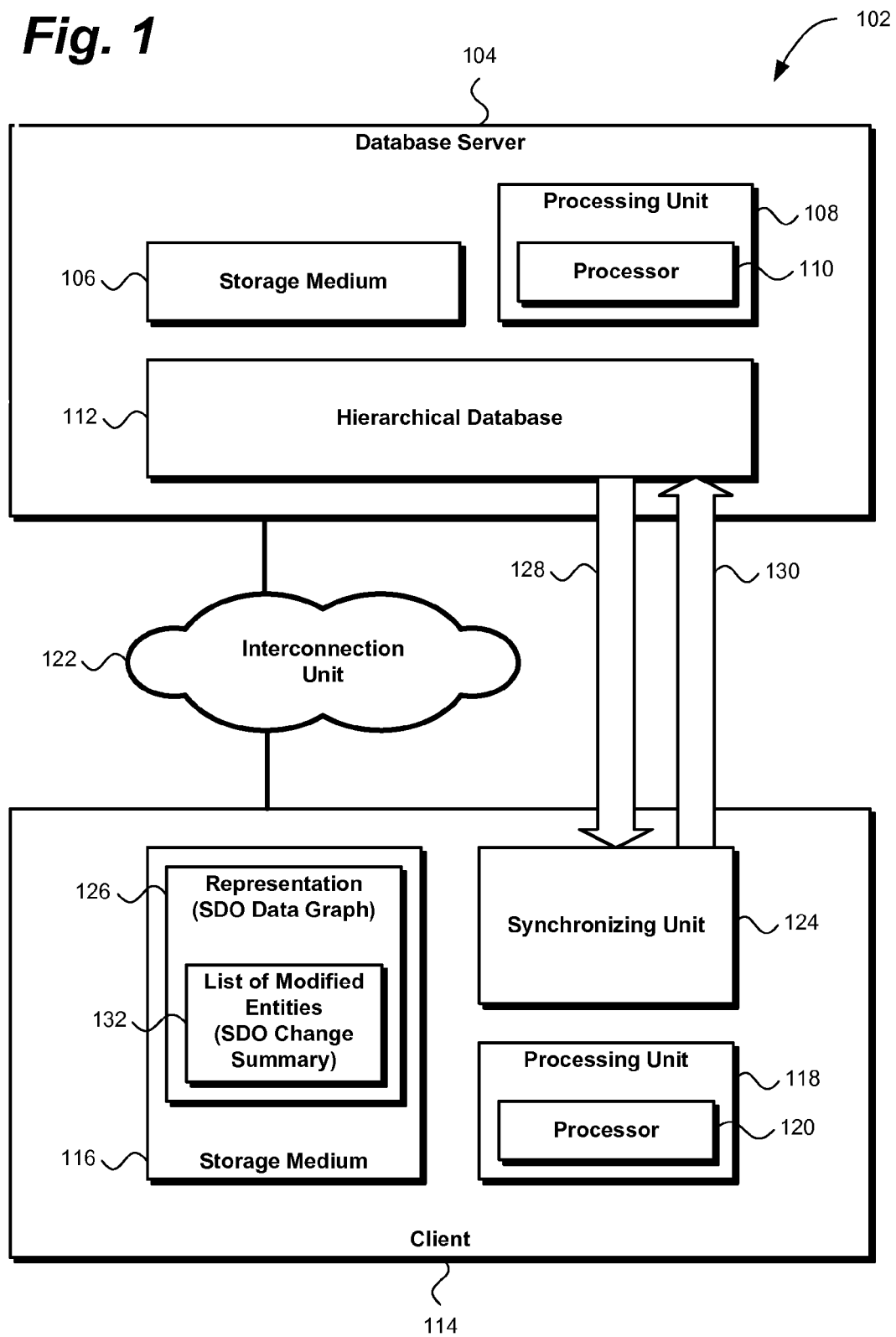
FIG. 1 shows an example environment embodying the present invention.

Turning to FIG. 1, an example environment 102 embodying the present invention is shown. It is initially noted that the environment 102 is presented for illustration purposes only, and is representative of countless configurations in which the invention may be implemented. Thus, the present invention should not be construed as limited to the environment configurations shown and discussed herein.

The environment 102 includes a database server 104. A database server may be any of a wide variety of systems configured to store and manage data. The database server 104 may be a general purpose computer. Such a computer may incorporate any of a wide variety of architectures. The computer, even if originally manufactured for a general purpose, may be configured specifically to process large quantities of data. The computer may be based on a general purpose operating system such as the IBM® z/OS® operating system, the IBM AIX® operating system, the Linux® operating system, any flavor of the UNIX® operating system or the Windows® operating system. IBM, z/OS and AIX are registered trademarks of international Business Machines Corporation, Armonk, N.Y., United States, in the United States, other countries, or both. Linux® is the registered trademark of Linus Torvalds in the United States and other countries. UNIX is a registered trademark of The Open Group. Windows is a registered trademark of Microsoft Corporation, Redmond, Wash., United States, in the United States and/or other countries. The computer may also be based on a special purpose operating system such as the IBM z/Transaction Processing Facility Enterprise Edition (z/TPF) operating system. A database server may also be manufactured for the specific purpose of storing and managing data. Moreover, a database server may incorporate any of a wide variety of computer program products.

The database server 104 may comprise a storage medium 106 configured to store data in a computer usable format. The storage medium may comprise any of a variety of technological devices configured to store data. Such technological devices may include without limitation hard drives, optical drives, floppy drives, random access memory (RAM), read-only memory (ROM), and erasable programmable read-only memory (EPROM or Flash memory).

The database server 104 may further comprise a processing unit 108 embedded in hardware, software or a combination thereof. The processing unit may comprise one or more processors 110. Specifically, a processor comprised by the processing unit may be a general purpose microprocessor. Each processor comprised by the processing unit is configured to execute program code.

The database server 104 may be connected to a variety of peripheral devices. Such peripheral devices may include a keyboard, a mouse and a display.

In an embodiment of the present invention, the database server 104 is an IBM zSeries® server executing the IBM z/TPF operating system. zSeries is a registered trademark of 2International Business Machines Corporation, Armonk, N.Y., United States, in the United States, other countries, or both.

The database server 104 executes a database 112. The database may be any of a variety of systems configured to store and manage data. The database may be implemented in hardware, software or a combination thereof. The data manipulated by the database may be stored at the storage medium 106. The database is further configured to process queries by searching for data matching the queries and returning the matching data. Moreover, the database is configured to modify the data stored thereat in response to requests from external entities. Additionally, the database may be configured to perform other tasks to manage the data stored thereat. The database 112 may perform any or all of the preceding tasks by causing instructions to be executed by the processing unit 108. Thus, the database may configure one or more processors 110 included in the processing unit to perform any or all of the preceding tasks. In an embodiment of the present invention, the database is a hierarchical database.

In an embodiment of the present invention, the database 112 is an IBM z/TPF Database Facility (z/TPFDF) database. The z/TPFDF database is a hierarchical database. A z/TPFDF database includes one or more subfiles. Each subfile contains zero or more records. A record in a z/TPFDF database is known as an LREC (Logical RECord). A z/TPFDF database may define one or more record types. A record type defines a set of fields and specifies the type of data which each field may contain. Each LREC is categorized as being of a specified record type. An LREC categorized as being of a record type contains the fields defined by that record type. It is noted that a single subfile may contain records having different record types.

It is emphasized that the present invention is not limited to z/TPFDF databases. As used herein, the term "set of records" includes a z/TPFDF subfile and also includes any other defined subset of a database capable of containing a plurality of records. Moreover, as used herein, the term "record" includes a z/TPFDF LREC and also includes any database record as the term is normally used in the art. Furthermore, as used herein, the term "record type" includes any definition wherein all records categorized as being of a specified record type share a common set of fields defined by the specified record type.

It is further emphasized that different record types may specify different schemas, layouts and fields. Thus, records having different record types may have different schemas, layouts and fields. Moreover, the actual data contained in records may vary even among records categorized as being of the same record type.

The database 112 may include links or pointers. It is noted that the terms "link" and "pointer" are used interchangeably herein. A link or a pointer associates data at one location within the database with data at another location within the database.

The database 112 may also include indices. An index may serve as a catalog facilitating efficient access to data located elsewhere at the database. Specifically, an index may comprise values included in records along with an indication of where the record containing the value is located. An index may index the data pointed to by a pointer.

A notable feature of many hierarchical databases known in the art is that indices and pointers are part of the actual data stored at the database, as opposed to being part of metadata which is separate from the actual data. Suppose that, in a database having this property, the value stored at an indexed field is updated. As a result, the index is updated to reflect the update to the field. It is emphasized that in this case, the index update occurs within the actual data.

In a z/TPFDF database, a pointer is implemented as a field containing the file address of the subfile to which the pointer points. The file address of a z/TPFDF subfile is described in further detail below.

Furthermore, in a hierarchical database, changes at an index can cascade to higher-level indices. Cascading changes to indexes can occur at multiple levels of indices. Cascading changes to indexes can also occur along multiple paths.

In the example database 112 shown in FIG. 1, indices and pointers are part of the actual data as described above. Moreover, changes at an index can cascade to higher-level indices as described above.

The example database 112 shown in FIG. 1 stores data related to air travel. The data relevant to the present example is included in three files within the database. Each file in the database includes zero or more subfiles. Each subfile in a file includes zero or more records.

The first file is known as the Flight file. The Flight file contains a single subfile containing a list of flights. Specifically, each record stored at this subfile contains information about a single flight. Each record stored at this subfile is known as a Flight record.

The second file is known as the Seat file. Each Flight record includes a pointer to a subfile of the Seat file. This subfile contains a list of passengers for the flight represented by the Flight record which contains a pointer thereto. Specifically, each record stored at a subfile of the Seat file associates a passenger with a seat number. A separate subfile of the Seat file exists for each record in the subfile of the Flight file.

The third file is known as the Passenger file. Each record in any subfile of the Seat file includes a pointer to a subfile of the Passenger file. A subfile of the Passenger file contains data regarding the passenger in the seat represented by the record in the subfile of the Seat file which contains a pointer thereto. A separate Passenger subfile exists for each passenger.

It is emphasized that the Flight file and the Seat file are index files because records in subfiles of both files point to information located elsewhere in the database. An index record is a single record in a subfile of an index file. In the present invention, an index record is permitted but not required to additionally contain data other than the index. Similarly, the z/TPFDF database and many other hierarchical databases permit but do not require index records to additionally contain data other than the index.

It is further noted that the Flight file is a top-level index file. This is the case because no indexes point to any Flight subfile. By contrast, the Seat file is a mid-level index file. This is the case because the Seat file contains index records, while index records in at least one other file point to subfiles of the Seat file. The Passenger file is at the lowest level. It is not an index file because it does not contain index records.

The environment 102 further includes one or more clients 114. A client may be any technological device configured to interact with a database 112.

A client 114 may be a general purpose computer. Such a computer may incorporate any of a wide variety of architectures. The computer may be based on a general purpose operating system such as the IBM z/OS operating system, the IBM AIX operating system, the Linux operating system, any flavor of the UNIX operating system or the Windows operating system. A client may also be a device other than a general purpose computer. Such devices may include hardware devices manufactured to perform a specific task. Such devices may also include personal digital assistants (PDA's) and mobile telephones. It is noted that the clients may be heterogeneous. Specifically, they may differ from each other in architecture, operating system or other important respects.

A client 114 may incorporate any of a wide variety of computer program products. Any or all of these computer program products may be configured to interact with a database 112.

A client 114 may comprise a storage medium 116 configured to store data in a computer usable format. The storage medium may comprise any of a variety of technological devices configured to store data. Such technological devices may include without limitation hard drives, optical drives, floppy drives, random access memory (RAM), read-only memory (ROM), and erasable programmable read-only memory (EPROM or Flash memory).

A client 114 may further comprise a processing unit 118 embedded in hardware, software or a combination thereof. The processing unit may comprise one or more processors 120. Specifically, a processor comprised by the processing unit may be a general purpose microprocessor. Each processor comprised by the processing unit is configured to execute program code.

The client 114 may be connected to a variety of peripheral devices. Such peripheral devices may include a keyboard, a mouse and a display.

The environment 102 further includes a network 122. The network may be any of a wide variety of systems known in the art for allowing two or more systems to communicate. The network may comprise any of a wide variety of networks such as the Internet, the public switched telephone network (PSTN), local area networks (LAN's) and wide area networks (WAN's). The network may employ any of a wide variety of network technologies such as Ethernet, IEEE 802.11, IEEE 802.16, the Bluetooth® technology, token ring, Digital Subscriber Line (DSL), cable Internet access, satellite Internet access, Integrated Services Digital Network (ISDN) and dial-up Internet access. Bluetooth is a registered trademark of Bluetooth SIG, Inc., Bellevue, Wash., United States. The network may include various topologies and protocols known to those skilled in the art, such as TCP/IP, UDP, and Voice over Internet Protocol (VoIP). The network may comprise direct physical connections, radio waves, microwaves or any combination thereof. Furthermore, the network may include various networking devices known to those skilled in the art, such as routers, switches, bridges, repeaters, etc.

It is noted that the network is not essential to the present invention. For example, a client 114 may be connected to the database server 104 via a direct hardware connection.

The environment 102 further includes a synchronizing unit 124. The synchronizing unit interfaces with the database 112 to facilitate modifying the contents of the database. The synchronizing unit may be implemented in hardware, software or a combination thereof.

In an embodiment of the present invention as shown in FIG. 1, the synchronizing unit 124 is implemented in software executing at the client 114. The synchronizing unit may read data from, and write data to, the storage medium 116 comprised by the client. Similarly, the synchronizing unit may cause instructions to be executed by the processing unit 118 comprised by the client and/or one or more processors 120 included therein.

In another embodiment of the present invention, the synchronizing unit 124 is implemented in software executing at the database server 104 but separate from the database 112. In another embodiment of the present invention, the synchronizing unit is integrated into the database. In either of these two embodiments, the synchronizing unit may read data from, and write data to, the storage medium 106 comprised by the database server. Similarly, the synchronizing unit may cause instructions to be executed by the processing unit 108 comprised by the database server and/or one or more processors 110 included therein.

In another embodiment of the present invention, the synchronizing unit 124 is implemented partly in software executing at the client 114 and partly in software executing at the database server 104. The software executing at the client is known as the client-side code. The software executing at the database server is known as the server-side code. Both the software executing at the client and the software executing at the database server may have the properties described above.

In another embodiment of the present invention, the synchronizing unit 124 is implemented in software executed at a computing system other than the database server. Such a computing system may include a storage medium and processing unit similar to those included in the client and the database server. The synchronizing unit may thus read data from, and write data to, the storage medium included in the computing system executing the synchronizing unit. Similarly, the synchronizing unit may cause instructions to be executed by the processing unit included in the computing system executing the synchronizing unit and/or by one or more processors included therein.

In another embodiment of the present invention, the synchronizing unit 124 is implemented in hardware.

The client 114 is configured to effect updates to the database 112. However, the client operates on a representation 126 of the database. New data may be inserted at the representation of the database. Data currently present at the representation of the database may be updated or deleted.

The representation 126 of the database may be stored at the storage medium 106 comprised by the client 114. Therefore, the client may achieve any of the operations on the representation of the database by writing data to the storage medium. Such operations may also cause data to be read from the storage medium. For example, it may be necessary to read data at the storage medium to find the current location of a record so that the contents of the record can be modified.

The database 112 may initially be replicated 128 to the representation 126 of the database. This replication may be performed by the synchronizing unit 124. It is contemplated that after this replication, the representation of the database and the actual database contain the same data. Thus, the client may perform any modifications on the representation of the database as opposed to the actual database.

The client 114 and any applications executing thereat may be unconcerned about the actual structure of data at the database 112. For example, it may be irrelevant to the client whether a given data element included in the representation 126 of the database is an LREC, a subfile or a fixed file within a z/TPFDF database. Instead, the client interacts with the representation of the database. Notably, when replicating 128 the database to the representation thereof, data retrieved and stored at the representation may be in a free format. Specifically, such data may have a logical structure which does not correspond precisely to the actual structure of corresponding data at the database. In an embodiment of the present invention, the synchronizing unit is implemented partly in server-side code and partly in client-side code as described above. The server-side code manages data conversion from the structure of the data in the representation of the database into the actual structure of the data at the database.

The synchronizing unit 124 then replicates 130 the contents of the representation 126 of the database back to the actual database 112. Replication may translate operations performed on the representation of the database to operations on the actual database. It is contemplated that after this replication, the representation of the database and the actual database contain the same data. A replication may be performed after a related group of changes has been made to the representation of the database. A replication may also be performed at periodic time intervals. In performing the replication, the synchronizing unit may read data from, and write data to, the representation of the database. Such reading and writing may be achieved by reading data to and writing data from a storage medium 116, 106 comprised by the client 114, the database server 104 or another computing system executing software implementing the synchronizing unit.

The database 112, the representation 126 thereof, or both may contain a large quantity of data. Replicating large quantities of data requires a large quantity of resources, notably processor time and bandwidth. Accordingly, the representation of the database comprises a list 132 of modified entities. Replication therefore comprises replicating only data entities included in the list of modified entities. Because the amount of data replicated is thus generally decreased, the quantity of resources required to perform the replication is advantageously reduced. Notably, the amount of processor time and bandwidth required is reduced.

In an embodiment of the present invention, the representation 126 of the database is an SDO data graph as defined by a Service Data Objects (SDO) specification. As used herein, the term "Service Data Objects specification" includes any version of any Service Data Objects specification. In an embodiment of the present invention, the SDO data graph and its subcomponents implement version 1.0 of the Service Data Objects (SDO) specification. Moreover, as used herein, the term "SDO data graph" includes a data graph as defined by any Service Data Objects specification. The data graph represents the entire database. The contents of the database 112 are represented as a tree structure within the data graph.

The SDO data graph may comprise one or more SDO data objects. As used herein, the term "SDO data object" includes a data object as defined by any Service Data Objects specification. In particular, an SDO data object may represent either an individual record or a set of records. Each data object may have one or more properties. A property may be either single-valued or many-valued. A single-valued property may have at most one value. A many-valued property may have multiple values. A property of a data object representing an individual record may be a data field contained by the record. Thus, a data object may include a property for each field contained by an individual record represented by the data object. A property of a data object representing an individual record may also be a reference. Accordingly, if a field in an individual record is a pointer, the corresponding property in the corresponding data object may be a reference. The reference may be a link or pointer to an SDO data object representing a set of records pointed to by the pointer.

For a z/TPFDF database such as the example database 112 shown in FIG. 1, a subfile may be represented as an SDO data object. An LREC may also be represented as an SDO data object. A data object representing an LREC may have one or more properties. A property of a data object representing an LREC may be a data field contained by the LREC. A property of a data object representing an LREC may also be a reference. Such a reference may be a link or a pointer to a lower-level subfile.

The example representation 126 of the database shown in FIG. 1 is an SDO data graph. The file included in the database 112 is represented as a many-valued property of the Root (containment) data structure of the data graph. Each subfile is represented by an SDO data object which is part of the many-valued property representing the file. The contents of the subfile are represented as a many-valued property of the data object representing the subfile. Each LREC is represented by an SDO data object which is part of the many-valued property representing the contents of the subfile. Each field is represented by a property of the data object representing the LREC. If the field is a pointer, the property of the data object may be a reference.

In an embodiment of the present invention, the list 132 of modified entities is a change summary as defined by a Service Data Objects specification. As used herein, the term "SDO change summary" includes a change summary as defined by any Service Data Objects specification. An SDO change summary is a data structure included in an SDO data graph 126. Changes to an SDO data graph are recorded at the SDO change summary included therein. In particular, modifications to properties of an SDO data object are recorded at the change summary. Recording the modification includes writing the old value and the new value of the property to the change summary. Recording modifications to properties may occur even when the property is a reference. Additionally, insertions and deletions of entire SDO data objects at an SDO data graph may be recorded at the SDO change summary. The change summary can be analyzed to determine the specific changes which were made to the data graph since the last synchronization of the data graph with the database 112.

It is noted that if the client 114 does not comprise the synchronizing unit 124, the client may transmit the representation 126 of the database to a system comprising the synchronizing unit 124. The client may also transmit a subset of the representation of the database. It is contemplated that any such subset includes the list 132 of modified entities.

As previously described, pointers and indexes in the example database 112 in FIG. 1 are included in the actual data. An index which is out of synchronization with the data indexed thereby is detrimental because it may point to data which are obsolete. Even when inserting data, failure to update a relevant index causes the index to omit the new data. Accordingly, in replicating 130 the contents of the representation 126 of the database to the actual database, the synchronizing unit 124 is configured to correctly update the pointers and indices within the actual data. It is noted that the inclusion of pointers within the actual data increases the complexity of the replication process.

Moreover, as previously described, changes at an index can cascade to higher-level indices. Failure to perform cascading index changes as required causes the relevant higher-level indexes to fall out of synchronization with the data indexed thereby. Accordingly, the synchronizing unit 124 is configured to cause any index updates to cascade to higher-level indices whenever cascading is required. As a result, all indices in the database beneficially remain consistent with the data indexed thereby.

Figure 2:
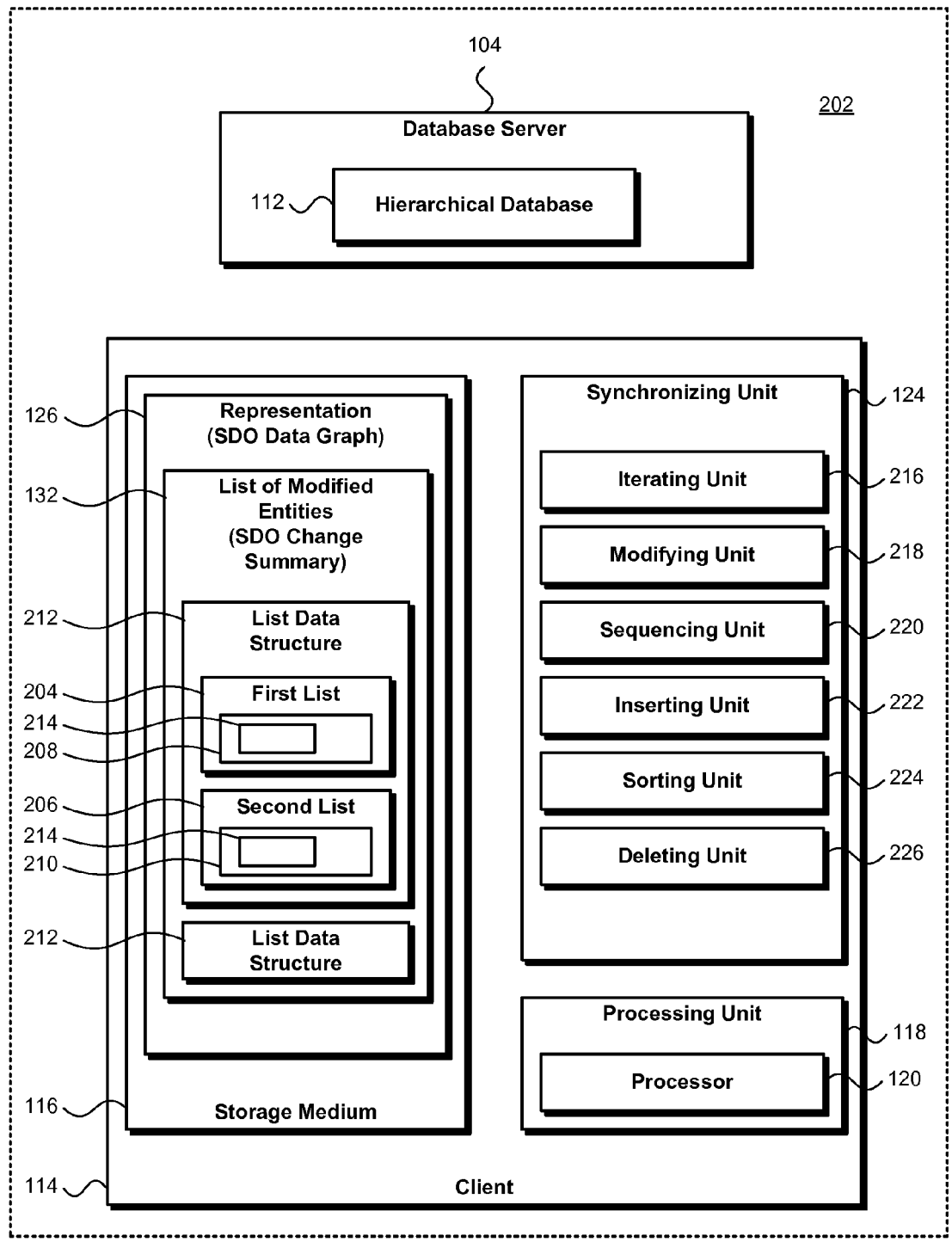
FIG. 2 illustrates a system for replicating modified data to a hierarchical database.

Turning now to FIG. 2, a system 202 for replicating modified data to a hierarchical database 112 is illustrated.

The system 202 shown in FIG. 2 may exist within an environment such as the example environment shown in FIG. 1.

The database may be the database shown in FIG. 1 and may have any of the properties described above in regards to FIG. 1. Notably, the database may be a hierarchical database.

The database 112 may be included in a database server 104. The database server may be the database server shown in FIG. 1 and may have any of the properties described above in regards to FIG. 1.

The system 202 includes one or more processors 120. A processor may, in turn, be included in a processing unit 118. The processing unit may be the processing unit included in the client shown in FIG. 1. Accordingly, a processor may be the processor included in the processing unit included in the client shown in FIG. 1. The processing unit and any processor may have the properties described above in regards to FIG. 1. The processing unit may achieve any of the operations performed thereby by causing instructions to be executed by one or more of the processors.

The processing unit may be included in a client 114. The client may be the client shown in FIG. 1 and may have any of the properties described above in regards to FIG. 1.

The client 114 may comprise a storage medium 116 configured to store data in a computer usable format. The storage medium may be the storage medium included in the client shown in FIG. 1 and may have any of the properties described above in regards to FIG. 1.

The system 202 further includes a list 132 of modified entities. The list of modified entities may be the list of modified entities shown in FIG. 1 and may have any of the properties described above in regards to FIG. 1.

The list 132 of modified entities may be stored at a storage medium. In the example system shown in FIG. 2, the list of modified entities is stored at the storage medium 116 comprised by the client 114.

The list 132 of modified entities may be included in a representation 126 of the database. The representation of the database may be the representation of the database shown in FIG. 1 and may have any of the properties described above in regards to FIG. 1. In an embodiment of the present invention, the representation of the database is a data graph as defined by a Service Data Objects specification.

The representation 126 of the database may be stored at a storage medium. In the example system shown in FIG. 2, the representation of the database is stored at the storage medium 116 comprised by the client 114.

The system 202 further includes at least one first list 204 and at least one second list 206. A first list comprises records 208 included in a set of records before at least one modification to the set of records. A second list comprises records 210 included in a set of records after at least one modification to the set of records.

The list 132 of modified entities comprises zero or more list data structures 212. A list data structure may represent a modified set of records belonging to both a first list 204 and a second list 206. A list data structure representing a modified set of records relates to a common set of records and a common modification or modifications to the common set of records. Thus, the first list comprises records 208 included in the common set of records before the common modifications to the set of records. The second list comprises records 210 included in the common set of records after the common modifications to the set of records.

Thus, if a record is modified by at least one modification to the set of records, the pre-modification record 208 is included in the first list 204 and the post-modification record 210 is included in the second list 206. The pre-modification record includes the contents of the record prior to the common modifications to the set of records. The post-modification record includes the contents of the record subsequent to the common modifications to the set of records. Those skilled in the art will appreciate that modifications to existing records usually do not modify at least one unique identifier field 214 included in the record. If this condition holds, the fact that a record in the first list was modified to equal a record in the second list can be detected by detecting that the record in the first list and the record in the second list have equal values for the unique identifier field or fields.

Moreover, if a record is deleted by the common modifications to the set of records, the pre-deletion record is included in the first list 204. The pre-deletion record includes the contents of the record prior to the common modifications to the set of records. The deleted record is absent from the second list 206. Therefore, the fact that a record in the first list was deleted can be detected by detecting that no record included in the second list has the same value as the record in the first list for the unique identifier field or fields 214.

Moreover, if a record is inserted by the common modifications to the set of records, the post-insertion record is included in the second list 206. The post-insertion record includes the contents of the record subsequent to the common modifications to the set of records. The inserted record is absent from the first list 204. Therefore, the fact that a record in the second list was inserted can be detected by detecting that no record included in the first list has the same value as the record in the second list for the unique identifier field or fields 214.

As used herein, the term "field" includes any discrete unit of data. The term "field" includes a field of a record in a database. The term "field" also includes any representation of a field of a record in the representation of the database. In particular, the term "field" includes a property in an SDO data graph representing a field of a record. The term "field" also may include discrete units of data which do not directly correspond to fields in records. Such discrete units of data include without limitation any unique identifier property included in an SDO data object, the data object address maintained by the Java™ platform and any other address which uniquely identifies a unit of data. Java is a trademark of Sun Microsystems, Inc., Santa Clara, Calif., United States, in the United States and other countries.

Accordingly, the unique identifier field may be the unique identifier property of an SDO data object. The unique identifier field may be a field contained in the relevant record type. The unique identifier field may also be a composite of two or more fields contained in the relevant record type. The unique identifier field may also be an address, including a data object address as maintained by the Java platform.

A list data structure 212 may also represent an inserted set of records belonging to a second list 206. In this case, the common modification to the set of records is the insertion of the set of records. Thus, the second list comprises records included in the common set of records after the insertion of the set of records. The first list 204 may contain no records or may be omitted.

A list data structure 212 may also represent a deleted set of records belonging to a first list 204. In this case, the common modification to the set of records is the deletion of the set of records. Thus, the first list comprises records included in the common set of records before the deletion of the set of records. The second list 206 may contain no records or may be omitted.

A list data structure 212 may also represent a unit of data other than a set of records. In particular, a list data structure may represent an individual record. The individual record may have been modified, inserted or deleted.

In an embodiment of the present invention, the list 132 of modified entities is a change summary as defined by a Service Data Objects specification. As previously discussed, modifications to properties of an SDO data object are recorded at the SDO change summary. A list data structure 212 may be a representation of a modification to a property of the SDO data object. The first list 204 may be a representation of the value of the property prior to the modification. The second list 206 may be a representation of the value of the property subsequent to the modification. In an embodiment of the present invention, list data structures are of the List data type defined by the Java programming language.

Thus, when the modified property contains a set of records, the first list comprises pre-modification records included in the set of records before at least one modification to the set of records. Similarly, the second list comprises post-modification records included in the same set of records after the same at least one modification to the set of records.

As previously discussed, an SDO data graph may represent data in a format which may not correspond precisely to the actual structure of the database 112. Thus, an SDO data graph may include SDO data objects but may omit a direct indication of whether each data object represents an individual record, a set of records or another unit of data. Furthermore, an SDO change summary records changes to SDO data objects. Therefore, the SDO change summary may likewise omit a direct indication of whether a data object noted thereat as having been modified represents an individual record, a set of records or another unit of data.

The system 202 further includes a synchronizing unit 124. The synchronizing unit may be the synchronizing unit shown in FIG. 1 and may have any of the properties described above in regards to FIG. 1. Notably, the synchronizing unit may be implemented in hardware, software or a combination thereof. The synchronizing unit may be a computer or may be comprised by a computer. The synchronizing unit may achieve any of the operations performed thereby by causing instructions to be executed by a processing unit such as the example processing unit 118 comprised by the client 114, a processor 120 such as the example processor included in the system and comprised by the example processing unit, or both. Moreover, the synchronizing unit may, in performing any of the operations performed thereby, read data from, and write data to, a storage medium such as the example storage medium 116 comprised by the client.

In the example system shown in FIG. 2, the synchronizing unit 124 is included in the client 114. It is emphasized that the synchronizing unit is not required to be included in the client. As described above, the synchronizing unit may also be included in a system other than the client.

In an embodiment of the present invention, the units shown in FIG. 2 do not directly transmit commands to the database 112. Instead, a unit may generate one or more commands which are added to a batch of commands. Each command may include one or more parameters. After completely processing the list 132 of modified entities, the batch of commands is then executed at the database. Executing the batch of commands may be achieved by transmitting the batch of commands to the database. The database may parse the received batch of commands, executing each command included therein in turn.

It is noted that as a result, the generated commands are buffered until all list data structures 208 included in the list of modified entities have been processed. The commands may be buffered in any intermediate form.

Replicating the representation 126 of the database back to the database 112 may be performed atomically. In particular, the batch of commands may be executed atomically. If any command included in the batch of commands fails, the entire batch of commands may be rolled back. In this event, an appropriate error message may be reported to a user.

Notably, collisions can occur if, for example, an attempt is made to create an index which already exists. If the database is configured to disallow collisions, a collision may be considered a failure condition causing the rollback behavior and error reporting described above.

The system 202 further includes an iterating unit 216. The iterating unit may be implemented in hardware, software or a combination thereof. The iterating unit may be a computer or may be comprised by a computer. The iterating unit may achieve any of the operations performed thereby by causing instructions to be executed by a processing unit such as the example processing unit 118 comprised by the client 114, a processor 120 such as the example processor included in the system and comprised by the example processing unit, or both. Moreover, the iterating unit may, in performing any of the operations performed thereby, read data from, and write data to, a storage medium such as the example storage medium 116 comprised by the client. In an embodiment of the present invention, the iterating unit is comprised by the synchronizing unit 124.

The iterating unit 216 is configured to iterate over the list 132 of modified entities. Specifically, the iterating unit may analyze each list data structure 212 included in the list of modified data entities.

In an embodiment of the present invention, any change to an individual record or field causes a list data structure 212 representing the set of records containing the individual record or field to be added to the list 132 of modified entities. The change may also cause a list data structure representing the individual record or field itself to be added to the list 132 of modified entities. Processing the list data structure representing the individual record or field is superfluous, for processing the list data structure representing the set of records causes all modifications to the set of records to be replicated. Therefore, for each list data structure, the iterating unit 216 may determine whether the list data structure represents a set of records. If the list data structure does not represent a set of records, the iterating unit may omit further processing of the list data structure. Thus, the iterating unit continues to the next list data structure included in the list of modified data entities, if any. Accordingly, the iterating unit only processes list data structures corresponding to sets of records. The iterating unit ignores any list data structure representing any other unit of data, including individual records and individual fields.

Moreover, if a list data structure 212 represents a unit of data which was not modified, the iterating unit 216 may omit further processing of the list data structure. Thus, the iterating unit continues to the next list data structure included in the list of modified data entities, if any.

For each list data structure 212 included in the list of modified entities, the iterating unit 216 is further configured to determine whether the list data structure represents a modified set of records. If the list data structure represents a modified set of records, the iterating unit is configured to cause the modifying unit 218 to perform the operations described below therefor for the first list 204 and the second list 206 of the list data structure.

For each list data structure 212 included in the list of modified entities, the iterating unit 216 is further configured to determine whether the list data structure represents an inserted set of records. If the list data structure represents an inserted set of records, the iterating unit 216 is further configured to cause the inserting unit 222 to perform the operations described below therefor for the list data structure.

For each list data structure 212 included in the list of modified entities, the iterating unit 216 is further configured to determine whether the list data structure represents a deleted set of records. If the list data structure represents an inserted set of records, the iterating unit 216 is further configured to cause the inserting unit 222 to perform the operations described below therefor for the list data structure. If the list data structure represents a deleted set of records, the iterating unit is further configured to cause the deleting unit 226 to delete the structure stored at the database 112 corresponding to the list data structure.

The system 202 further comprises a modifying unit 218. The modifying unit may be implemented in hardware, software or a combination thereof. The modifying unit may be a computer or may be comprised by a computer. The modifying unit may achieve any of the operations performed thereby by causing instructions to be executed by a processing unit such as the example processing unit 118 comprised by the client 114, a processor 120 such as the example processor included in the system and comprised by the example processing unit, or both. Moreover, the modifying unit may, in performing any of the operations performed thereby, read data from, and write data to, a storage medium such as the example storage medium 116 comprised by the client. In an embodiment of the present invention, the modifying unit is comprised by the synchronizing unit 124.

The modifying unit 218 is configured to identify each pre-modification record 208 included in the first list 204 and each post-modification record 210 included in the second list 206 for which the pre-modification record and the post-modification record have equal values for at least one unique identifier field 214.

For each record thus identified, the modifying unit is configured to determine whether the pre-modification record 208 includes an index and the post-modification record 210 includes an index corresponding to the same field as the index included in the pre-modification record. The modifying unit is configured to perform two actions if this condition holds. The first action is to remove information about a structure pointed to by the pre-modification record from an index included in a target record. The target record is stored at the hierarchical database 112 and has the same value as the post-modification record for the at least one unique identifier field 214. The second action is to add information about a structure pointed to by the post-modification record to the index included in the target record.

For each record thus identified, the modifying unit 218 is further configured to determine whether neither the pre-modification record 208 nor the post-modification record 210 includes an index. If this condition holds, the modifying unit is configured to modify the target record so that the target record contains at least one value included in the post-modification record and not included in the pre-modification record. The target record is the same record described regarding the preceding condition.

The modifying unit 218 is further configured to identify each pre-deletion record included in the first list 204 for which no record included in the second list 206 has the same value as the pre-deletion record for the at least one unique identifier field 214. For each record thus identified, the modifying unit is configured to determine whether the pre-deletion record includes an index. If the pre-deletion record includes an index, the modifying unit is configured to remove information about a structure pointed to by the pre-deletion record from an index included in a record stored at the database 112 and having the same value as the pre-deletion record for the at least one unique identifier field. If instead the pre-deletion record does not include an index, the modifying unit is configured to delete the record stored at the database and having the same value as the pre-deletion record for the at least one unique identifier field.

The modifying unit 218 is further configured to identify each post-insertion record included in the second list 206 for which no record included in the first list 204 has the same value as the post-insertion record for the at least one unique identifier field 214. For each record thus identified, the modifying unit is configured to determine whether the post-insertion record includes an index. If the post-insertion record includes an index, the modifying unit is configured to add information about a structure pointed to by the post-insertion record to an index included in a record stored at the database and having the same value as the post-insertion record for the at least one unique identifier field. If the post-insertion record does not include an index, the modifying unit is configured to insert at the database a record containing at least one value included in the post-insertion record.

In a z/TPFDF database 112, each subfile has a sequence number and a file address. The sequence number indicates a number of updates made to the subfile since the subfile was created. For a new subfile, the sequence number may be initialized to zero or one. The sequence number for the subfile is incremented upon every modification to the subfile, including internal modifications made by the database. The file address facilitates directly and efficiently locating the subfile in the database without accessing an index.

The database 112 shown in FIG. 2 is a z/TPFDF database. Therefore, each subfile in the database has a sequence number and a file address. Accordingly, the representation of each subfile within the representation 126 of the database includes the sequence number and the file address for the subfile.

If the sequence number of a subfile at the database 112 is equal to the sequence number of the representation of the subfile within the representation 126 of the database, the subfile and its representation are in synchronization. Otherwise, the subfile and its representation are not in synchronization. This fact advantageously facilitates replication because it can thus be efficiently determined whether the subfile needs to be synchronized with its representation or vice versa.

The actions performed by the modifying unit 218 as described above may cause the sequence number to be updated at the database 112. Therefore, the modifying unit may retrieve the updated sequence number for any updated subfile at the database. The modifying unit may then update the corresponding sequence number in the representation 126 of the database to equal the retrieved sequence number. Similarly, the modifying unit may retrieve an updated file address for any updated subfile at the database. The modifying unit may then update the corresponding file address in the representation of the database to equal the retrieved file address.

More generally, a set of records in a database may have a sequence number, a file address, or both. The sequence number may be similar to the structure described above. The file address may be any addressing information facilitating locating the set of records. The modifying unit 126 may retrieve an updated sequence number, an updated file address, or both for any updated set of records at the database 112. The modifying unit may then update the corresponding sequence number, file address or both in the representation 126 of the database to equal the corresponding retrieved data.

Furthermore, any of the units described below may, after updating or creating a set of records at the database, retrieve an updated or created sequence number, an updated or created file address, or both for the set of records. The unit may then update the corresponding sequence number, file address or both in the representation 126 of the database to equal the corresponding retrieved data.

The system 202 further comprises a sequencing unit 220. The sequencing unit may be implemented in hardware, software or a combination thereof. The sequencing unit may be a computer or may be comprised by a computer. The sequencing unit may achieve any of the operations performed thereby by causing instructions to be executed by a processing unit such as the example processing unit 118 comprised by the client 114, a processor 120 such as the example processor included in the system and comprised by the example processing unit, or both. Moreover, the sequencing unit may, in performing any of the operations performed thereby, read data from, and write data to, a storage medium such as the example storage medium 116 comprised by the client. In an embodiment of the present invention, the sequencing unit is comprised by the synchronizing unit 124.

Changes to data at the database may cause an index at the database to be updated. Moreover, updates to indices may cascade to higher-level indices as described above. A higher-level index updated by such cascading index updates may be located at a subfile or a set of records which was not directly modified. However, any modification to a subfile or a set of records causes the sequence number of the subfile or set of records to be incremented. Thus, cascading index updates may cause the sequence numbers at the representation 126 of the database for one or more subfiles or sets of records which were not directly modified to fall out of synchronization with the corresponding sequence numbers at the database 112.

To address this issue, the sequencing unit 220 is configured to analyze the representation 126 of the database to identify sets of records included in the database 112 having a potential to be modified by a cascade of an update to an index. This analysis may be performed before any actual changes are performed at the database. In an embodiment of the present invention, the sequencing unit is configured to examine an SDO data graph to determine which sets of records have the potential to be affected by changes in indexes. The sets of records may be subfiles of a z/TPFDF database.

The sequencing unit 220 is further configured to retrieve a sequence number for each identified set of records. In an embodiment of the present invention, retrieving the sequence number is achieved by adding a special command to the batch of commands. The special command is configured to retrieve the updated sequence number for the subfile or the set of records. The special command may be configured to be performed after any other command in the batch of commands, with the exception of other special commands to retrieve updated sequence numbers. For example, if the batch of commands is executed in order, the special command may be added at the end of the batch of commands.

The sequencing unit 220 is further configured to update each sequence number at the representation 126 of the database which corresponds to a retrieved sequence number to be equal to the retrieved sequence number. Updating the sequence numbers may occur during or after execution of the batch of commands.

The system 202 further comprises an inserting unit 222. The inserting unit may be implemented in hardware, software or a combination thereof. The inserting unit may be a computer or may be comprised by a computer. The inserting unit may achieve any of the operations performed thereby by causing instructions to be executed by a processing unit such as the example processing unit 118 comprised by the client 114, a processor 120 such as the example processor included in the system and comprised by the example processing unit, or both. Moreover, the inserting unit may, in performing any of the operations performed thereby, read data from, and write data to, a storage medium such as the example storage medium 116 comprised by the client. In an embodiment of the present invention, the inserting unit is comprised by the synchronizing unit 124.

As discussed above, the iterating unit 216 causes the inserting unit 222 to operate on a specified list data structure 212. The inserting unit is configured to create a new structure at the database 112. Generally, because the specified list data structure represents a set of records, the structure inserted at the database is a set of records. In particular, the structure inserted at the database may be a subfile of a z/TPFDF database.

The inserting unit 222 is further configured to retrieve each record having a containment relationship relative to an inserted set of records represented by the specified list data structure. The inserting unit is further configured to insert each retrieved record at the new structure at the database 112.

The system 202 further comprises a sorting unit 224. The sorting unit may be implemented in hardware, software or a combination thereof. The sorting unit may be a computer or may be comprised by a computer. The sorting unit may achieve any of the operations performed thereby by causing instructions to be executed by a processing unit such as the example processing unit 118 comprised by the client 114, a processor 120 such as the example processor included in the system and comprised by the example processing unit, or both. Moreover, the sorting unit may, in performing any of the operations performed thereby, read data from, and write data to, a storage medium such as the example storage medium 116 comprised by the client. In an embodiment of the present invention, the sorting unit is comprised by the synchronizing unit 124.

The sorting unit 224 is configured to sort the records retrieved by the inserting unit 222 on at least one field. The records may be sorted before a request to insert the records at the database is submitted internally. Accordingly, the inserting unit 222 may, when inserting each retrieved record at the new structure, cause the records retrieved by the inserting unit to be inserted in an order resulting from the sorting operation.

The system 202 further comprises a deleting unit 226. The deleting unit may be implemented in hardware, software or a combination thereof. The deleting unit may be a computer or may be comprised by a computer. The deleting unit may achieve any of the operations performed thereby by causing instructions to be executed by a processing unit such as the example processing unit 118 comprised by the client 114, a processor 120 such as the example processor included in the system and comprised by the example processing unit, or both. Moreover, the deleting unit may, in performing any of the operations performed thereby, read data from, and write data to, a storage medium such as the example storage medium 116 comprised by the client. In an embodiment of the present invention, the deleting unit is comprised by the synchronizing unit 124.

As discussed above, the iterating unit 216 causes the deleting unit 226 to delete a specified list data structure 212. The deleting unit is configured to delete a structure stored at the database 112 and corresponding to the specified list data structure. Generally, because the list data structure represents a set of records, the structure deleted from the database is a set of records. In particular, the structure deleted from the database may be a subfile of a z/TPFDF database.

Figure 3:
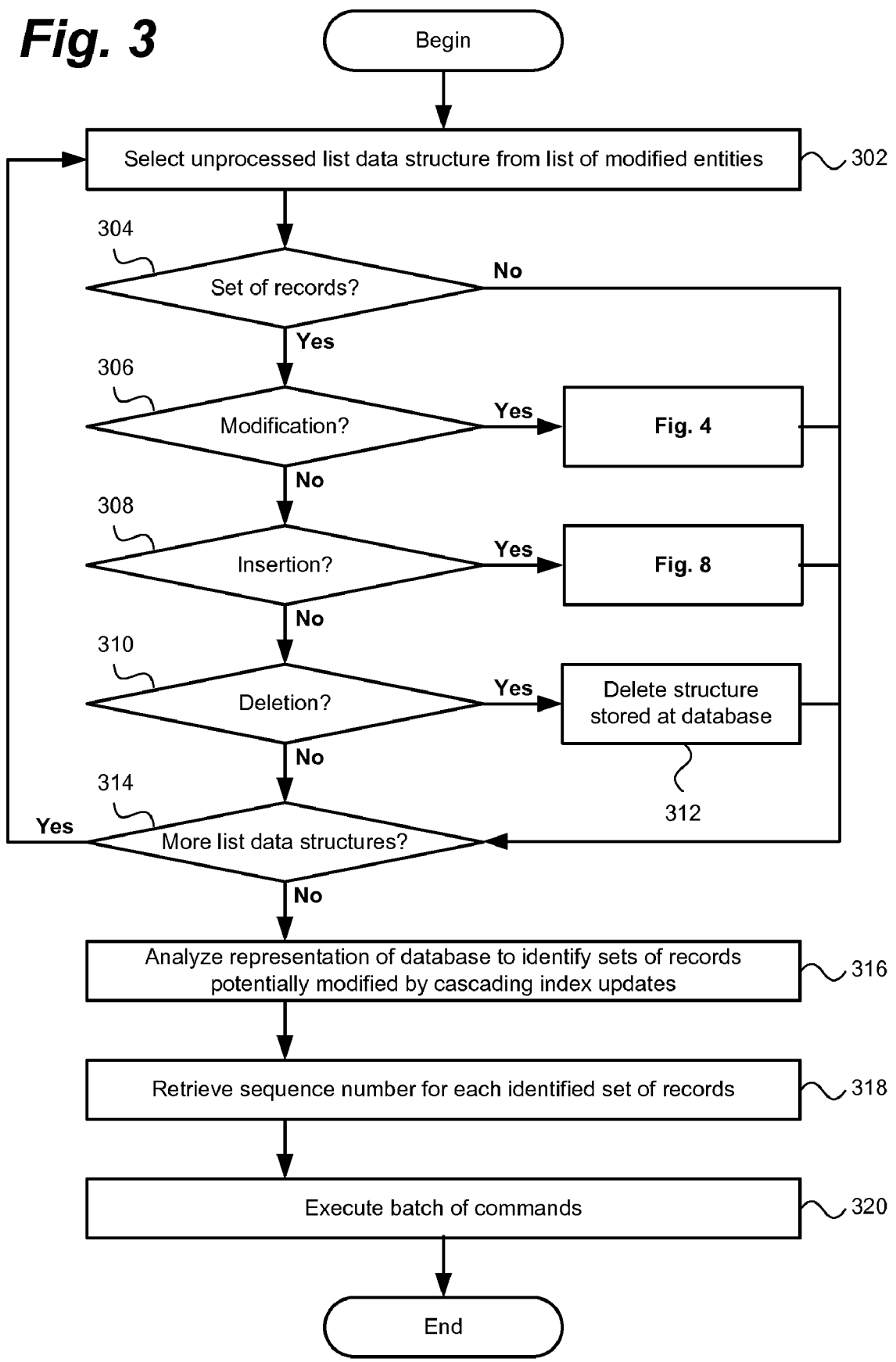
FIG. 3 demonstrates a sequence of operations for replicating modified data to a hierarchical database.

Turning now to FIG. 3, a sequence of operations for replicating modified data to a hierarchical database is demonstrated.

The sequence of operations demonstrated in FIG. 3 operates on a list of modified entities. The list of modified entities may be the list of modified entities shown in FIGS. 1 and 2 and may have any of the properties described above in regards to FIGS. 1 and 2. In an embodiment of the present invention, the list 132 of modified entities is a change summary as defined by a Service Data Objects specification.

The list of modified entities comprises zero or more list data structures. The list data structure may be the list data structure shown in FIG. 2 and may have any of the properties described above in regards to FIG. 2. The list data structure may represent a change to an SDO data object.

Each of the one or more list data structures which represents a modified set of records comprises a first list comprising records included in the set of records before at least one modification to the set of records and a second list comprising records included in the set of records after the same at least one modification to the set of records.

In an embodiment of the present invention, the operations shown in FIGS. 3-8 do not directly transmit commands to the database. Instead, an operation may generate a command which is added to a batch of commands as described above.

At selecting operation 302, a list data structure which has not yet been processed is selected from the list of modified entities. Selecting operation 302 may be performed at an iterating unit such as the iterating unit shown in FIG. 2. After selecting operation 302 is completed, control passes to determining operation 304.

It is emphasized that as a result, iteration over the list of modified entities is performed. Specifically, the sequence of operations beginning with determining operation 304 is performed for each list data structure comprised by the list of modified entities. If the list of modified entities is an SDO change summary, iteration occurs over representations of all changes to SDO data objects included in the SDO data graph which contains the SDO change summary.

In an embodiment of the present invention, the first list is retrieved from the SDO change summary. The second list is retrieved from the SDO data graph to which the SDO change summary relates.

At determining operation 304, it is determined whether the list data structure represents a set of records. Determining operation 304 may be performed at an iterating unit such as the iterating unit shown in FIG. 2.

Determining operation 304 may determine whether the list data structure represents a z/TPFDF subfile. As described above, a SDO data graph may omit a direct indication of whether each SDO data object included therein represents an individual record, a set of records or another unit of data. However, a z/TPFDF subfile has properties which are absent from z/TPFDF LREC's. Examples of such properties include the sequence number and the file address described above. Because the SDO data object representing the z/TPFDF subfile was replicated from the subfile, the SDO data object accordingly has these properties, including a sequence number and a file address. Thus, determining operation 304 may analyze the list data structure, the SDO data object for which the list data structure represents a change, or both to determine whether one or more specific properties are present. Such properties may include the sequence number and the file address.

Moreover, sets of records in databases other than the z/TPFDF database may have properties which are absent from records in the database. Therefore, determining operation 304 may determine that the list data structure represents a set of records as described above for databases other than the z/TPFDF database.

If the list data structure represents a set of records, control passes to determining operation 306. If the list data structure does not represent a set of records, control passes to determining operation 314. It is emphasized that as a result, any list data structure which represents an individual record, or which otherwise does not represent a set of records, is ignored.

Figure 4:
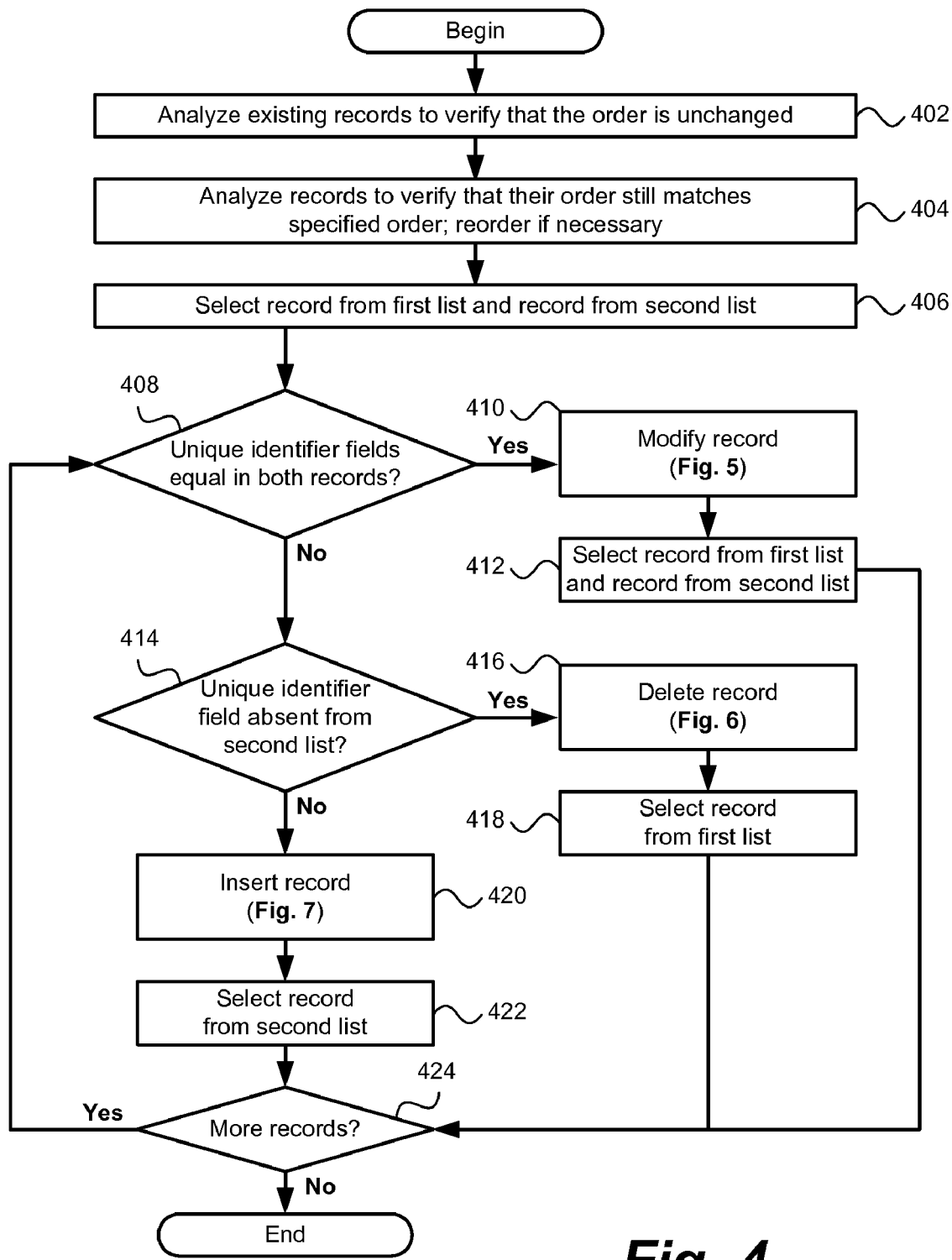
FIG. 4 demonstrates a sequence of operations for replicating a modified set of records to a hierarchical database.

At determining operation 306, it is determined whether the list data structure represents a modification to existing data, as opposed to an insertion of new data or a deletion of existing data. Thus, determining operation 306 may determine whether an SDO data object for which the list data structure denotes a change was modified. Determining operation 306 may be performed at an iterating unit such as the iterating unit shown in FIG. 2. If the list data structure represents a modification of existing data, the operations shown in FIG. 4 are performed. After performing the operations shown in FIG. 4, control passes to determining operation 314. If instead the list data structure does not represent a modification of existing data, control passes to determining operation 308.

It is noted that performing both determining operation 304 and determining operation 306 determines whether the list data structure represents a modified set of records. Thus, the operations shown in FIG. 4 are performed only if the list data structure represents a modified set of records.

Figure 8:
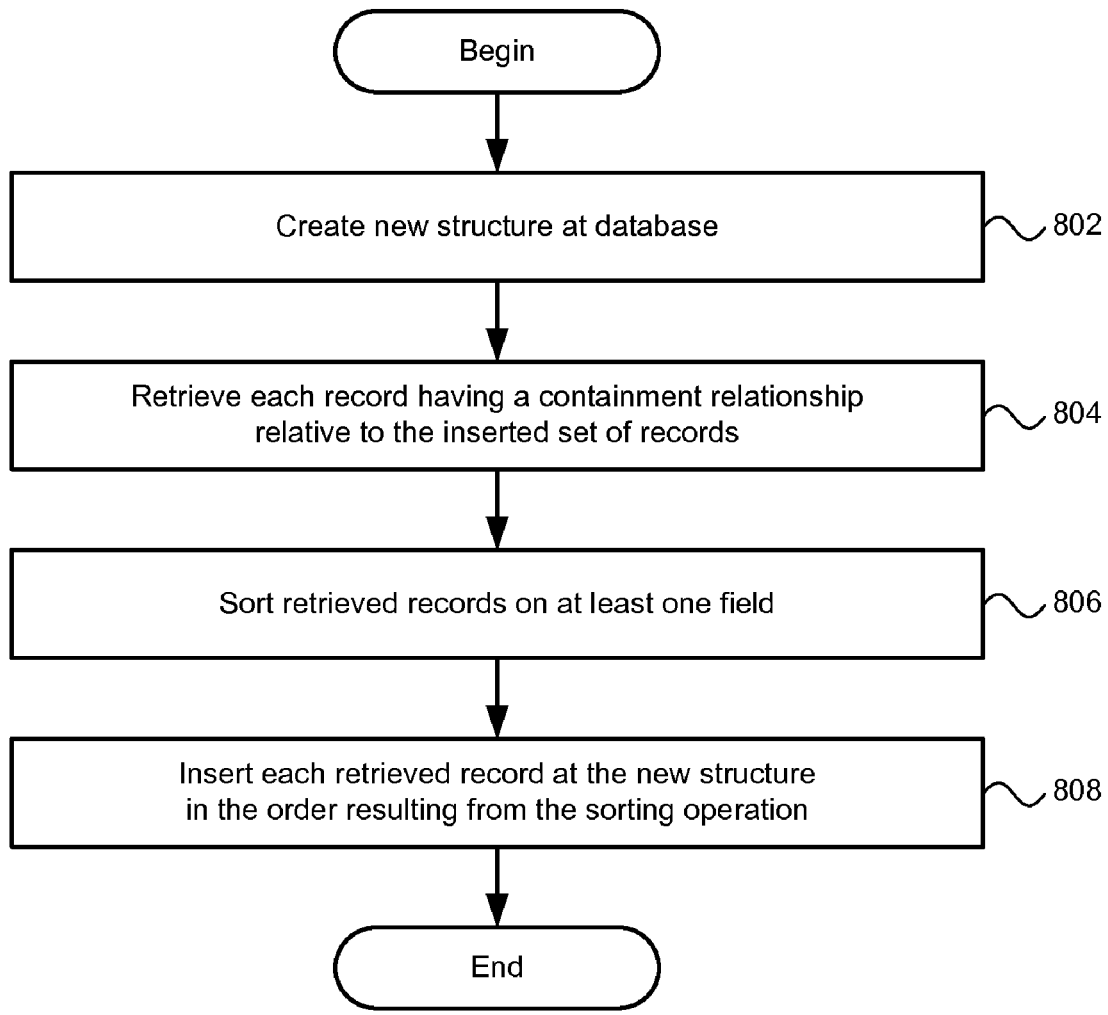
FIG. 8 demonstrates a sequence of operations for replicating an inserted set of records to a hierarchical database.

At determining operation 308, it is determined whether the list data structure represents an insertion of new data. Thus, determining operation 308 may determine whether an SDO data object for which the list data structure denotes a change was inserted. Determining operation 308 may be performed at an iterating unit such as the iterating unit shown in FIG. 2. If the list data structure represents an insertion of new data, the operations shown in FIG. 8 are performed. After performing the operations shown in FIG. 8, control passes to determining operation 314. If instead the list data structure does not represent an insertion of new data, control passes to determining operation 310.

It is noted that performing both determining operation 304 and determining operation 308 determines whether the list data structure represents an inserted set of records. Thus, the operations shown in FIG. 8 are performed only if the list data structure represents an inserted set of records.

At determining operation 310, it is determined whether the list data structure represents a deletion of existing data. Thus, determining operation 310 may determine whether an SDO data object for which the list data structure denotes a change was deleted. Determining operation 310 may be performed at an iterating unit such as the iterating unit shown in FIG. 2. If the list data structure represents a deletion of existing data, control passes to deleting operation 312. If instead the list data structure does not represent a deletion of existing data, control passes to determining operation 314.

It is noted that performing both determining operation 304 and determining operation 310 determines whether the list data structure represents a deleted set of records. Thus, deleting operation 312 is performed only if the list data structure represents a deleted set of records.

It is further noted that if a list data structure represents a set of records which was unchanged, no action is performed regarding the list data structure by the operations shown in FIG. 3.

At deleting operation 312, a structure stored at the database and corresponding to the list data structure is deleted. Deleting operation 312 may be performed at a deleting unit such as the deleting unit shown in FIG. 2.

It is noted that deleting operation 312 is not performed unless the list data structure is determined at determining operation 304 to represent a set of records. Therefore, the structure deleted from the database is a set of records. In particular, the structure deleted from the database may be a subfile of a z/TPFDF database.

After deleting operation 312 is completed, control passes to determining operation 314.

At determining operation 314, it is determined whether at least one list data structure in the list of modified entities has not been processed. Determining operation 314 may be performed at an iterating unit such as the iterating unit shown in FIG. 2. If at least one list data structure in the list of modified entities has not been processed, control passes to selecting operation 302. If all list data structures in the list of modified entities have been processed, control passes to analyzing operation 316.

At analyzing operation 316, a representation of the database is analyzed to identify sets of records included in the database having a potential to be modified by a cascade of an update to an index. The representation of the database may be the representation of the database shown in FIGS. 1 and 2 and may have any of the properties described above in regards to FIGS. 1 and 2. Analyzing operation 316 may be performed at a sequencing unit such as the sequencing unit shown in FIG. 2.

In an embodiment of the present invention, analyzing operation 316 examines an SDO data graph to determine which sets of records have the potential to be affected by changes in indexes. Specifically, the SDO data graph is traversed from its root to a record which was changed. For an inserted record, only the post-insertion SDO data graph is traversed. For a deleted record, only the pre-deletion SDO data graph is traversed. For a modified record, both the pre-modification and post-modification SDO graphs are traversed. This traversal finds a path from a top-level set of records to the set of records including the changed record. Every set of records along this path is determined to have the potential to be affected by changes in indexes. These operations may be repeated for every record for which a change is noted in the list of modified entities. These operations may also be repeated only for each such record which is an index record.

After analyzing operation 316 is completed, control passes to retrieving operation 318.

At retrieving operation 318, a sequence number is retrieved for each identified set of records. Moreover, any other data potentially updated by the cascading changes may be retrieved. In particular, the indices themselves which may potentially have been modified by a cascade of an update to an index may be retrieved. The data thus retrieved may be stored at the representation of the database. Retrieving operation 318 may be performed at a sequencing unit such as the sequencing unit shown in FIG. 2. After retrieving operation 318 is completed, control passes to executing operation 320.

At executing operation 320, a batch of commands generated during the operations shown in FIGS. 3-8 is executed at the database. Executing operation 320 may be performed at a synchronizing unit such as the synchronizing unit shown in FIGS. 1 and 2.

Executing the batch of commands may be achieved by transmitting the batch of commands to the database. The database may parse the received batch of commands, executing each command included therein in turn. The batch of commands may be executed atomically.

After executing operation 320 is completed, the sequence of operations for replicating modified data to a hierarchical database terminates.

Turning now to FIG. 4, a sequence of operations for replicating a modified set of records to a hierarchical database is demonstrated.

The operations shown in FIG. 4 may be performed at a modifying unit such as the modifying unit shown in FIG. 2.

Moreover, the sequence of operations shown in FIG. 4 is invoked at determining operation 306. Determining operation 306 analyzes a list data structure selected at selecting operation 302. Thus, the sequence of operations shown in FIG. 4 operates on the selected list data structure.

Moreover, the selected list data structure is known to represent a modified set of records. Therefore, the selected list data structure comprises, or is otherwise associated with, a first list and a second list. As previously described, the first list comprises records included in the set of records before at least one modification to the set of records. The second list comprises records included in the same set of records after the same at least one modification to the set of records. The sequence of operations shown in FIG. 4 operates on the first list and the second list.

In an embodiment of the present invention, the records included in the first list and the second list are represented by SDO data objects. Each SDO data object may comprise a unique identifier property. This property may be the data object address as maintained by the Java platform. Records are manipulated by manipulating the SDO data objects representing the records. Thus, the unique identity of a record is determined by analyzing data at the SDO data object. Accordingly, the unique identifier field may be the unique identifier property of an SDO data object. Specifically, the unique identifier field may be a data object address as maintained by the Java platform. The unique identifier field may also be one or more properties of an SDO data object, with each property representing a field in a record. In any of these cases, the unique identifier fields described above are compared to determine whether two SDO data objects represent the same record.

If a plurality of subfiles are modified by the changes recorded at the list of modified entities, the operations shown in FIG. 4 may be repeated separately for each subfile being modified.

Moreover, in some databases known in the art, a set of records may contain records having a plurality of record types. In the z/TPFDF database, a subfile may include records having a plurality of record types. In an embodiment of the present invention, the operations shown in FIG. 4 are repeated separately for each record type present in the first list, the second list, or both.

At analyzing operation 402, records existing prior to the most recent replication are analyzed. The existing records are analyzed to verify that the order of the records was not changed.

In an embodiment of the present invention, for a specific subfile, a list of pre-modification records and a list of post-modification records are analyzed simultaneously. If a record in the pre-modification list is absent from the post-modification list, the pre-modification record is omitted from further analysis. Conversely, if a record in the post-modification list is absent from the pre-modification list, the post-modification record is omitted from further analysis. It is emphasized that inserted records and deleted records are ignored as a result. Iteration then occurs over the remaining records in both the pre-modification list and the post-modification list. If the unique identifier field in the records in both lists are identical, the next records in both lists are considered. If instead the unique identifier fields are not identical, an error is reported, and the present sequence of operations terminates.

After analyzing operation 402 is completed, control passes to ordering operation 404.

It is noted that in a z/TPFDF database, an ordering of records may be specified for each file. When an ordering of records is specified, all subfiles in the file adhere to the ordering. The ordering may specify one or more fields on which records are to be sorted. The ordering may further specify that sorting on a field is to be performed in an ascending order or in a descending order. The records in each subfile are then sorted based on the values in the specified field or fields. For example, the records in each subfile of a given file may be sorted in ascending order based on the second field. Records having the same value in the second field may then be sorted in descending order based on the first field. Alternatively, a file in a z/TPFDF database can be completely unordered.

At ordering operation 404, all records, including new records created or modified since the most recent replication, are analyzed to verify that the order of the records still matches a specified order. The specified order may be the ordering specified for the relevant file in a z/TPFDF database as described above. If the actual order of the records does not match the specified order, the records may be sorted according to the specified order.

In an embodiment of the presentation, metadata maps the format of data in the database to an SDO data graph containing the representation of the database. The metadata comprises information on the order of records for each file. The information specifies the fields on which the records are sorted. The information further specifies an order for each field, e.g., ascending or descending. Ordering operation 404 sorts the records based on the order described in the metadata using program code expressed in the Java programming language.

After ordering operation 404 is completed, control passes to selecting operation 406.

At selecting operation 406, the first record is selected from the first list. Similarly, the first record is selected from the second list. After selecting operation 406 is completed, control passes to determining operation 408. It is emphasized that selecting operation 406 begins an iteration over both the first list and the second list simultaneously. Both lists may be processed in order from the first record to the last record included therein.

At determining operation 408, it is determined whether the selected record included in the first list and the selected record included in the second list have equal values for at least one unique identifier field.

Specifically, unique identifiers representing the unique identifier fields and included in SDO data objects representing the selected records are compared. In an embodiment of the present invention, the comparison is performed by a facility known as Comparator. Comparator is based on the Java platform. The records to be compared and a function configured to perform the comparison are passed as parameters to the Comparator facility. The function is configured to compare the records based on a defined sort order. The Comparator facility thus sorts the records according to the defined sort order. Furthermore, Java facilities similar to Comparator may also be employed.

If both records have equal values for the unique identifier field or fields, control passes to modifying operation 410. If both records do not have equal values for unique identifier field or fields, control passes to determining operation 412.

Figure 5:
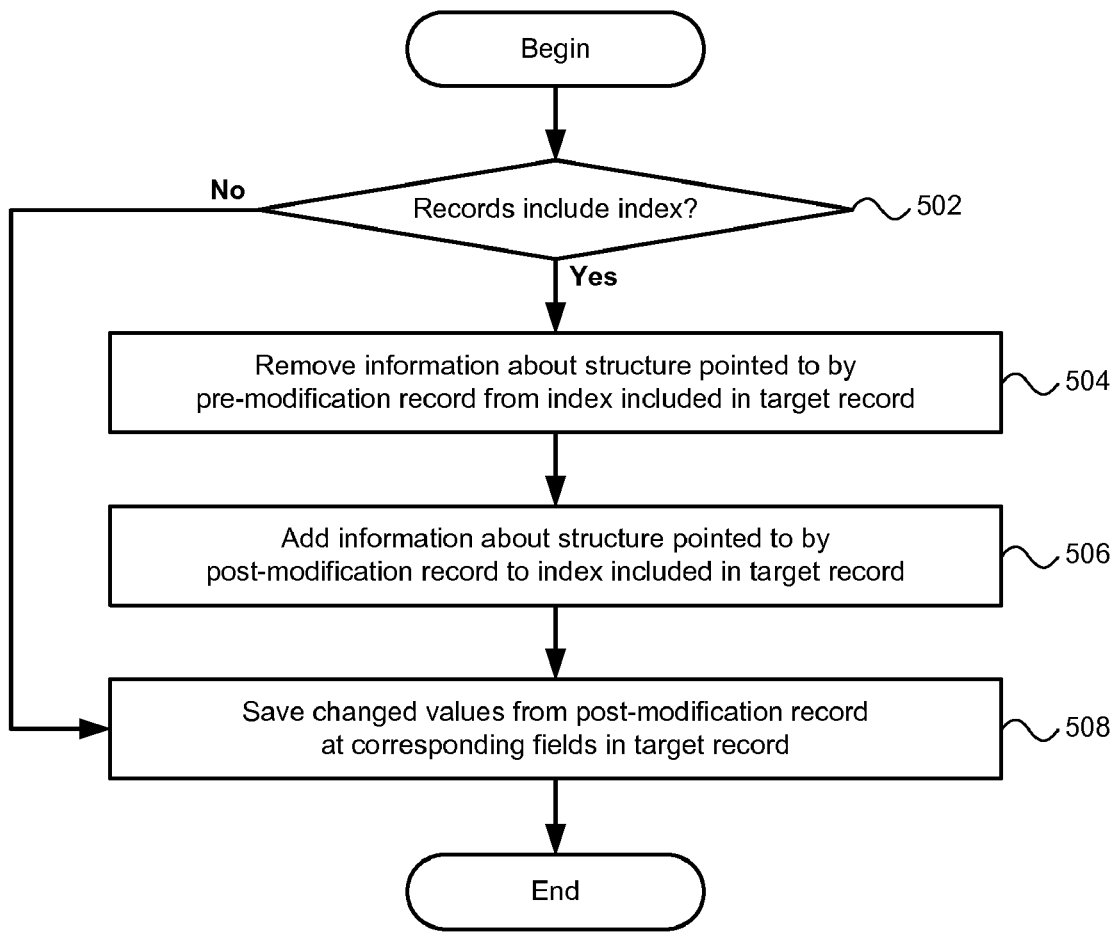
FIG. 5 demonstrates a sequence of operations for replicating a modified record to a hierarchical database.

At modifying operation 410, the operations shown in FIG. 5 are performed. Generally, modifying operation 410 modifies a target record at the database. The target record corresponds to the pre-modification record, namely the selected record included in the first list. The target record is updated to match the post-modification record, namely the selected record included in the second list. The operations shown in FIG. 5 may operate on the pre-modification record and the post-modification record or on SDO data objects representing both records. After modifying operation 410 is completed, control passes to selecting operation 412.

At selecting operation 412, the next record is selected in both the first list and the second list. After selecting operation 410 is completed, control passes to determining operation 408.

At determining operation 414, it is determined whether no record included in the second list has the same value as the selected record included in the first list for the at least one unique identifier field. In making this determination, determining operation 414 may employ the Comparator facility described above. If no record has the same value for the unique identifier field or fields, control passes to deleting operation 416. If at least one record has the same value for the unique identifier field or fields, control passes to determining operation 420.

Figure 6:
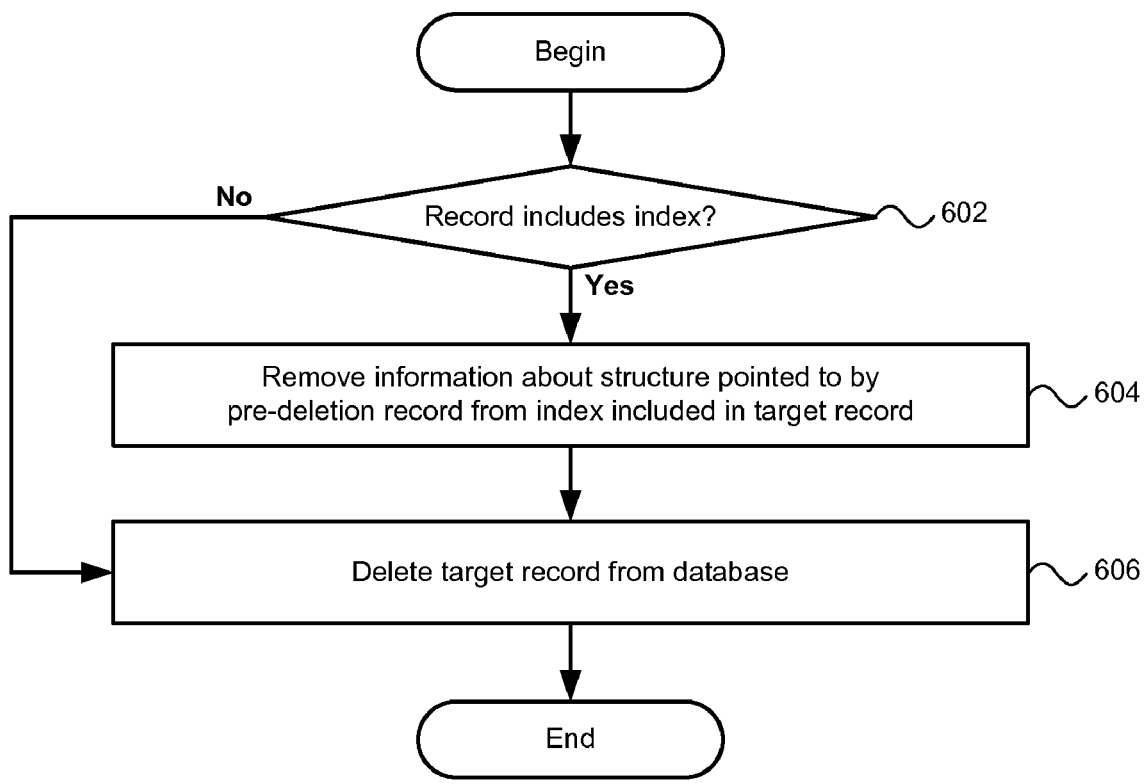
FIG. 6 demonstrates a sequence of operations for replicating a deleted record to a hierarchical database.

At deleting operation 416, the operations shown in FIG. 6 are performed. Generally, deleting operation 416 deletes the pre-deletion record, namely the selected record included in the first list, from the database. The operations shown in FIG. 6 may operate on the pre-deletion record or an SDO data object representing the pre-deletion record. After deleting operation 416 is completed, control passes to selecting operation 418.

At selecting operation 418, the next record is selected in the first list. The currently selected record in the second list remains selected. After selecting operation 418 is completed, control passes to determining operation 408.

Figure 7:
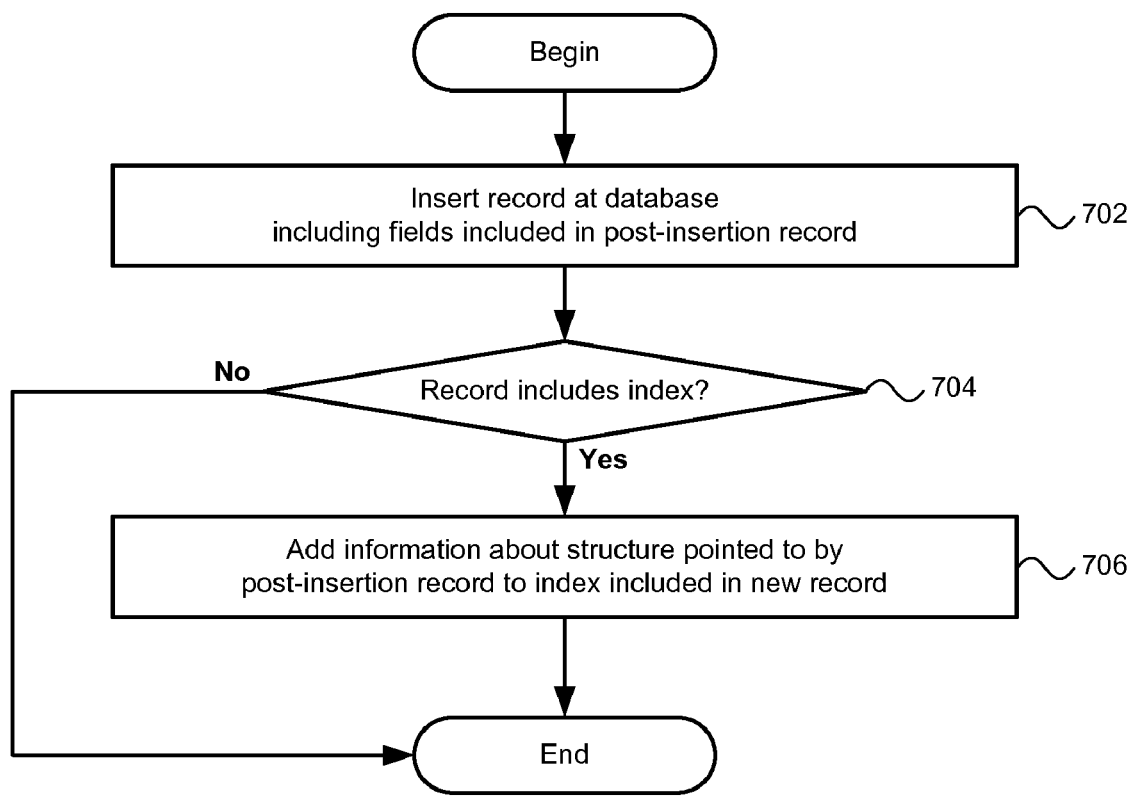
FIG. 7 demonstrates a sequence of operations for replicating an inserted record to a hierarchical database.

At inserting operation 420, the operations shown in FIG. 7 are performed. Generally, inserting operation 420 inserts the post-insertion record, namely the selected record included in the second list, at the database. The operations shown in FIG. 7 may operate on the post-insertion record or an SDO data object representing the post-insertion record. After inserting operation 420 is completed, control passes to selecting operation 422.

At selecting operation 422, the next record is selected in the second list. The currently selected record in the first list remains selected. After selecting operation 422 is completed, control passes to determining operation 408.

At determining operation 424, it is determined whether all records have been processed in both the first list and the second list. If all records have been processed in both lists, control passes to determining operation 314 of FIG. 3. If at least one record has not been processed in either list, control passes to determining operation 408.

If the first list has at least one unprocessed record and the second list has no unprocessed records, deleting operation 416 operates on each remaining unprocessed record in the first list. Conversely, if the second list has at least one unprocessed record and the first list has no unprocessed records, inserting operation 420 operates on each remaining unprocessed record in the second list.

It is emphasized that the first list and the second list were previously ordered. As a result of this ordering, the operations shown in FIG. 4 cause the operations shown in FIG. 5 to be performed for each pre-modification record included in the first list and each post-modification record included in the second list for which the pre-modification record and the post-modification record have equal values for the at least one unique identifier field.

Moreover, the operations shown in FIG. 4 cause the operations shown in FIG. 6 to be performed for each pre-deletion record included in the first list for which no record included in the second list has the same value as the pre-deletion record for the at least one unique identifier field.

Furthermore, the operations shown in FIG. 4 cause the operations shown in FIG. 7 to be performed for each post-insertion record included in the second list for which no record included in the first list has the same value as the post-insertion record for the at least one unique identifier field.

Turning now to FIG. 5, a sequence of operations for replicating a modified record to a hierarchical database is demonstrated.

The operations shown in FIG. 5 may be performed at a modifying unit such as the modifying unit shown in FIG. 2. In an embodiment of the present invention, the operations shown in FIG. 5 are performed by computer code included in a function named LRECUpdate.

At determining operation 502, it is determined whether the pre-modification record includes an index and the post-modification record includes an index corresponding to the same field as the index included in the pre-modification record.

In an embodiment of the present invention, SDO data objects representing the pre-modification record and the post-modification record are examined. Specifically, metadata about the structure of the record type of the pre-modification record and the post-modification record may be examined. The metadata may be expressed using Extensible Markup Language (XML). The metadata may be based on object code which specifies the format of the fields for one or more record types.

If the pre-modification record includes an index and the post-modification record includes an index corresponding to the same field as the index included in the pre-modification record, control passes to removing operation 504. Otherwise, control passes to modifying operation 508.

At removing operation 504, information about a structure pointed to by the pre-modification record is removed from an index included in a target record. The target record is stored at the hierarchical database. Moreover, the target record has the same value as the post-modification record for the at least one unique identifier field.

Specifically, removing operation 504 may be performed one level below the index. At that level, index information may be collected. The information may be collected at successively higher levels of indices. In some cases, collection may continue all the way to a top-level index. In other cases, the relevant indexing information may be duplicated in a mid-level index. When this is the case, it is unnecessary to continue all the way to the top-level index, as all required information is present at the mid-level index. Thus, collection may continue until the mid-level index is reached. The subfile or set of records previously pointed to by the pre-modification record is then de-indexed using the collected information.

In the example database introduced in regards to FIG. 1, if a record in a subfile of the Seat table is deleted, it may be necessary to remove information from the index which relates to a subfile of the Passenger file which is pointed to by the Seat record. As discussed previously, the Seat record is a mid-level index record. In this database, it is necessary to collect indexing information from both the Seat file and the Flight file in order to remove the information.

If the pre-modification record and the post-modification record each include two or more indices, the preceding operations may be repeated for each index.

After removing operation 504 is completed, control passes to adding operation 506.

At adding operation 506, information about a structure pointed to by the post-modification record is added to the index included in the target record. The target record is as defined above regarding removing operation 504.

Adding operation 506 may also be performed one level below the index. At that level, index information may be collected. The information may be collected at successively higher levels of indices. In some cases, collection may continue all the way to a top-level index. In other cases, collection may continue until a mid-level index is reached. The subfile or set of records pointed to by the new index record is then indexed using the collected information.

Again, if the pre-modification record and the post-modification record each include two or more indices, the preceding operations may be repeated for each index.

After adding operation 506 is completed, control passes to modifying operation 508.

It is noted that removing operation 504 and adding operation 506 may cause multiple indices throughout the file to be updated. These changes to the database may be replicated back to the representation thereof at analyzing operation 316 and retrieving operation 318 of FIG. 3.

At modifying operation 508, for each non-index field for which the value in the pre-modification record is not equal to the value included in the post-modification record, the value included in the post-modification record is saved at the corresponding field in the target record. Again, the target record is as defined above regarding removing operation 504; this is true whether or not removing operation 504 was executed.

It is emphasized that as long as at least one non-index field was modified, modifying operation 508 causes the target record to be modified so that the target record contains at least one value included in the post-modification record and not included in the pre-modification record. Furthermore, modifying operation 508 is performed even if neither the pre-modification record nor the post-modification record includes an index. Additionally, modifying operation 508 may be performed by a computer.

It is noted that an index record may simultaneously contain index fields and non-index (data) fields. Mid-level indices, such as the second level of a three-level index, commonly have this property. It is noted that the sequence of operations shown in FIG. 5 beneficially causes the index fields to be updated such that the indices remain consistent while causing the non-index fields to be updated normally.

After modifying operation 508 is completed, processing continues within the sequence of operations which invoked the operations shown in FIG. 5.

Turning now to FIG. 6, a sequence of operations for replicating a deleted record to a hierarchical database is demonstrated.

The operations shown in FIG. 6 may be performed at a modifying unit such as the modifying unit shown in FIG. 2. In an embodiment of the present invention, the operations shown in FIG. 6 are performed by computer code included in a function named LRECDelete.

At determining operation 602, it is determined whether the pre-deletion record includes an index. In an embodiment of the present invention, an SDO data object representing the pre-deletion record is examined. Specifically, metadata about the structure of the record type of the pre-deletion record may be examined. The metadata may be the same metadata described above in regards to FIG. 5. If the pre-deletion record includes an index, control passes to removing operation 604. If the pre-deletion record does not include an index, control passes to deleting operation 606.

At removing operation 604, information about a structure pointed to by the pre-deletion record is removed from an index included in a target record. The target record is stored at the hierarchical database. Moreover, the target record has the same value as the pre-deletion record for the unique identifier field or fields.

Specifically, removing operation 604 may collect index information. The information may be collected at successively higher levels of indices. In some cases, collection may continue all the way to a top-level index. In other cases, collection may continue until a mid-level index is reached. The subfile or set of records previously pointed to by the pre-modification record is then de-indexed using the collected information.

Removing operation 604 may also invoke a special database command to remove an index from the detail file. It is noted that the detail file in a z/TPFDF database is distinct from the file from which the record is deleted.

If the pre-deletion record includes two or more indices, the preceding operations may be repeated for each index.

After removing operation 604 is completed, control passes to deleting operation 606.

At deleting operation 606, the target record is deleted from the database. The target record is as defined above regarding removing operation 604; this is true whether or not removing operation 604 was performed.

After deleting operation 606 is completed, processing continues within the sequence of operations which invoked the operations shown in FIG. 6.

Turning now to FIG. 7, a sequence of operations for replicating an inserted record to a hierarchical database is demonstrated.

The operations shown in FIG. 7 may be performed at a modifying unit such as the modifying unit shown in FIG. 2. In an embodiment of the present invention, the operations shown in FIG. 7 are performed by computer code included in a function named LRECInsert.

In the example sequence of operations shown in FIG. 7, the post-insertion record is being inserted at a subfile of the Seat file of the example database shown in FIG. 1. As previously discussed, records in subfiles of the Seat file point to Passenger subfiles. In this example, the relevant Passenger subfile has already been inserted at the database.

At inserting operation 702, a record is inserted at the database. The inserted record may include all non-index fields included in the post-insertion record. In particular, the inserted record includes the unique identifier field or fields included in the post-insertion record.

It is noted that, except in the case wherein the post-insertion record does not include any non-index fields, the inserted record contains at least one value included in the post-insertion record. It is further noted that this condition holds even if the post-insertion record does not include an index.

Thus, in the example sequence of operations in FIG. 7, a record is inserted at the Seat subfile of the database. The record includes all non-index fields included in the post-insertion record.

After inserting operation 702 is completed, control passes to determining operation 704.

At determining operation 704, it is determined whether the post-insertion record includes an index. In an embodiment of the present invention, an SDO data object representing the post-insertion record is examined. Specifically, metadata about the structure of the record type of the post-insertion record may be examined. The metadata may be the same metadata described above in regards to FIG. 5. If the post-insertion record includes an index, processing continues with adding operation 706. If the post-insertion record does not include an index, processing continues within the sequence of operations which invoked the operations shown in FIG. 7.

In the example sequence of operations in FIG. 7, the Seat file is an index file. Accordingly, the record inserted at inserting operation 702 contains an index, namely the index to the subfile of the Passenger file. Therefore, control passes to adding operation 706.

At adding operation 706, information about a structure pointed to by the post-insertion record is added to an index included in the record inserted at inserting operation 706. This record is stored at the database. Moreover, inserting operation 702 caused this record to have the same value as the post-insertion record for the unique identifier field or fields.

Because the record was just inserted, the index does not yet exist. Therefore, the index is created. In an embodiment of the present invention, adding operation 706 comprises accessing the structure being indexed. Then, a special database command named "DBIDX" is invoked. The DBIDX command creates the index record in the appropriate file. The index record is then pointed to the record being indexed. Thus, in the example sequence of operations in FIG. 7, the DBIDX command accesses the Seat file, creates the Seat index record and points it to the new Passenger record.

Adding operation 706 may collect index information. The information may be collected at successively higher levels of indices. In some cases, collection may continue all the way to a top-level index. In other cases, collection may continue until a mid-level index is reached. The subfile or set of records pointed to by the new index record is then indexed using the collected information.

As previously discussed, each record in the subfile of the Flight file points to a Seat subfile. Therefore, after inserting the record at the Seat subfile, the index in the record in the subfile of the Flight file which points to the subfile of the Seat file is updated. Updating this index beneficially ensures internal consistency.

If the post-insertion record includes two or more indices, the preceding operations may be repeated for each index.

After adding operation 706 is completed, processing continues within the sequence of operations which invoked the operations shown in FIG. 7.

In an embodiment of the present invention, inserting operation 702 and adding operation 706 are performed simultaneously when the post-insertion record includes an index. Thus, the post-insertion record is inserted at the database simultaneously with adding information about a structure pointed to by the inserted record to an index included in the inserted record.

Turning now to FIG. 8, a sequence of operations for replicating an inserted set of records to a hierarchical database is demonstrated.

The sequence of operations shown in FIG. 4 is invoked at determining operation 308. Determining operation 308 analyzes a list data structure selected at selecting operation 302. Thus, the sequence of operations shown in FIG. 8 operates on the selected list data structure.

At creating operation 802, a new structure is created at the database. Creating operation 802 may be performed at an inserting unit such as the inserting unit shown in FIG. 2.

It is noted that the operations shown in FIG. 8 are not performed unless the selected list data structure is determined at determining operation 304 to represent a set of records. Therefore, the structure created at the database is a set of records. In particular, the structure created at the database may be a subfile of a z/TPFDF database.

In an embodiment of the present invention, creating operation 802 updates an SDO data graph to include a newly created data object representing the new structure at the database.

After creating operation 802 is completed, control passes to retrieving operation 804.

At retrieving operation 804, each record having a containment relationship relative to the inserted set of records represented by the list data structure is retrieved. Specifically, an SDO data graph serving as the representation of the database may be analyzed. All SDO data objects representing containment properties of the SDO data object represented by the selected list data structure may be retrieved from the SDO data graph. As previously noted, the selected list data structure represents a set of records.

In an embodiment of the present invention, retrieving operation 804 retrieves the records by invoking the getList( ) method defined by the Service Data Objects API on the newly created data object created in the SDO data graph at creating operation 802.

Retrieving operation 804 may be performed at an inserting unit such as the inserting unit shown in FIG. 2. After retrieving operation 804 is completed, control passes to sorting operation 806.

At sorting operation 806, the records retrieved at retrieving operation 804 are sorted on at least one field. Sorting operation 806 may be performed at a sorting unit such as the sorting unit shown in FIG. 2.

The subfile or other structure created at creating operation 804 may specify a sort order therefor. The sort order may include one or more fields. It is noted that the sort order may be specified separately for each field in the record. Sorting operation 806 may sort the records according to the specified sort order. After sorting operation 806 is completed, control passes to inserting operation 808.

At inserting operation 808, each retrieved record is inserted at the new structure at the database. The retrieved records are inserted in the order resulting from sorting operation 806. Inserting operation 808 may be performed at an inserting unit such as the inserting unit shown in FIG. 2. After inserting operation 808 is completed, control passes to determining operation 314 of FIG. 3.

Another aspect of the invention is directed to embodiments that can be embodied in the form of computer-implemented processes and apparatuses for practicing those processes. For example, the computer implemented operations for replicating modified data to a hierarchical database are embodied in computer program code executed by computer processors.

Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention.

Embodiments include computer program code logic, for example, whether stored in a storage medium, loaded into and/or executed by a computer, wherein, when the computer program code logic is loaded into and executed by a computer, the computer becomes an apparatus for practicing the invention. When implemented on a general-purpose microprocessor, the computer program codes configure the microprocessor to create specific logic circuits.

Additionally, at least one program storage device readable by a machine, tangibly embodying at least one program of instructions executable by the machine to perform the capabilities of the system can be provided. The article of manufacture can be included as a part of a computer system or sold separately.

The capabilities of the operations for replicating modified data to a hierarchical database can be implemented in software, firmware, hardware or some combination thereof. The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention. Furthermore, the use of the terms a, an, etc. do not denote a limitation of quantity, but rather denote the presence of at least one of the referenced item.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for replicating modified data to a hierarchical database, the method comprising:
for each pre-modification record included in a first list and each post-modification record included in a second list for which the pre-modification record and the post-modification record have equal values for at least one unique identifier field, wherein the first list comprises records included in a set of records before at least one modification to the set of records, and wherein the second list comprises records included in the set of records after the at least one modification to the set of records:
(a) if the pre-modification record includes an index and the post-modification record includes an index corresponding to the same field as the index included in the pre-modification record:
removing information about a first structure pointed to by the pre-modification record from an index included in a target record, the target record stored at the hierarchical database and having the same value as the post-modification record for the at least one unique identifier field, and
adding information about a second structure pointed to by the post-modification record to the index included in the target record, and
(b) if neither the pre-modification record nor the post-modification record includes an index, modifying the target record so that the target record contains at least one value included in the post-modification record and not included in the pre-modification record, wherein modifying the target record is performed by a computer.

2. The method of claim 1, further comprising:
for each pre-deletion record included in the first list for which no record included in the second list has the same value as the pre-deletion record for the at least one unique identifier field:
(c) if the pre-deletion record includes an index, removing information about a third structure pointed to by the pre-deletion record from an index included in a record stored at the database and having the same value as the pre-deletion record for the at least one unique identifier field, and
(d) if the pre-deletion record does not include an index, deleting the record stored at the database and having the same value as the pre-deletion record for the at least one unique identifier field.

3. The method of claim 1, further comprising:
for each post-insertion record included in the second list for which no record included in the first list has the same value as the post-insertion record for the at least one unique identifier field:
(e) if the post-insertion record includes an index, adding information about a fourth structure pointed to by the post-insertion record to an index included in a record stored at the database and having the same value as the post-insertion record for the at least one unique identifier field, and
(f) if the post-insertion record does not include an index, inserting at the database a record containing at least one value included in the post-insertion record.

4. The method of claim 1, further comprising:
analyzing a representation of the database to identify sets of records included in the database having a potential to be modified by a cascade of an update to an index; and
retrieving a sequence number for each identified set of records.

5. The method of claim 1, further comprising:
iterating over a list of modified entities, the list of modified entities comprising one or more list data structures, wherein each of the one or more list data structures which represents a modified set of records comprises a first list comprising records included in the set of records before at least one modification to the set of records and a second list comprising records included in the set of records after the at least one modification to the set of records;
for each list data structure comprised by the list of modified entities:
determining whether the list data structure represents the modified set of records, and
if the list data structure represents the modified set of records, performing the method steps recited by claim 1 for the first list and the second list comprised by the list data structure.

6. The method of claim 5, wherein the list of modified entities is a change summary as defined by a Service Data Objects specification.

7. The method of claim 5, further comprising:
for each list data structure comprised by the list of modified entities:
determining whether the list data structure represents an inserted set of records;
if the list data structure represents the inserted set of records:
creating a new structure at the database,
retrieving each record having a containment relationship relative to the inserted set of records represented by the list data structure, and
inserting each retrieved record at the new structure at the database.

8. The method of claim 7, further comprising sorting the retrieved records on at least one field; and
wherein inserting each retrieved record at the new structure causes the retrieved records to be inserted in an order resulting from the sorting operation.

9. The method of claim 5, further comprising:
for each list data structure comprised by the list of modified entities:
determining whether the list data structure represents a deleted set of records; and
if the list data structure represents the deleted set of records, deleting a structure stored at the database and corresponding to the list data structure.

10. A system for replicating modified data to a hierarchical database, the system comprising:
a processor;
a first list comprising pre-modification records included in a set of records before at least one modification to the set of records;
a second list comprising post-modification records included in the set of records after the at least one modification to the set of records; and
a modifying unit configured to, for each pre-modification record included in the first list and each post-modification record included in the second list for which the pre-modification record and the post-modification record have equal values for at least one unique identifier field:
(a) if the pre-modification record includes an index and the post-modification record includes an index corresponding to the same field as the index included in the pre-modification record:
remove information about a first structure pointed to by the pre-modification record from an index included in a target record, the target record stored at the hierarchical database and having the same value as the post-modification record for the at least one unique identifier field, and
add information about a second structure pointed to by the post-modification record to the index included in the target record, and
(b) if neither the pre-modification record nor the post-modification record includes an index, modify the target record so that the target record contains at least one value included in the post-modification record and not included in the pre-modification record.

11. The system of claim 10, wherein the modifying unit is further configured to:
for each pre-deletion record included in the first list for which no record included in the second list has the same value as the pre-deletion record for the at least one unique identifier field:
(c) if the pre-deletion record includes an index, remove information about a third structure pointed to by the pre-deletion record from an index included in a record stored at the database and having the same value as the pre-deletion record for the at least one unique identifier field, and
(d) if the pre-deletion record does not include an index, delete the record stored at the database and having the same value as the pre-deletion record for the at least one unique identifier field.

12. The system of claim 10, wherein the modifying unit is further configured to:
for each post-insertion record included in the second list for which no record included in the first list has the same value as the post-insertion record for the at least one unique identifier field:
(e) if the post-insertion record includes an index, add information about a fourth structure pointed to by the post-insertion record to an index included in a record stored at the database and having the same value as the post-insertion record for the at least one unique identifier field, and
(f) if the post-insertion record does not include an index, insert at the database a record containing at least one value included in the post-insertion record.

13. The system of claim 10, further comprising a sequencing unit configured to:
analyze a representation of the database to identify sets of records included in the database having a potential to be modified by a cascade of an update to an index; and
retrieve a sequence number for each identified set of records.

14. The system of claim 10, further comprising:
a list of modified entities comprising at least one list data structure, wherein the list data structure represents a modified set of records belonging to both the first list and the second list; and
an iterating unit configured to iterate over the list of modified entities and cause the modifying unit to perform the operations recited therefor by claim 10 for the first list and the second list of the list data structure.

15. The system of claim 14, further comprising:
an inserting unit configured to:
create a new structure at the database,
retrieve each record having a containment relationship relative to an inserted set of records represented by the list data structure, and
insert each retrieved record at the new structure at the database; and
wherein the iterating unit is further configured to, for each list data structure comprised by the list of modified entities:
determine whether the list data structure represents the inserted set of records, and
if the list data structure represents the inserted set of records, cause the inserting unit to perform the operations recited therefor for the list data structure.

16. The system of claim 15, further comprising a sorting unit configured to sort the records retrieved by the inserting unit on at least one field; and
wherein inserting each retrieved record at the new structure causes the records retrieved by the inserting unit to be inserted in an order resulting from the sorting operation.

17. The system of claim 14, further comprising:
a deleting unit configured to delete a structure stored at the database and corresponding to the list data structure; and
wherein the iterating unit is further configured to, for each list data structure in the list of modified entities:
determine whether the list data structure represents a deleted set of records, and
if the list data structure represents the deleted set of records, cause the deleting unit to delete the structure stored at the database corresponding to the list data structure.

18. A computer program product embodied in a computer usable memory comprising:
computer readable program codes coupled to the computer usable memory for replicating modified data to a hierarchical database, the computer readable program codes configured to cause the program to:
for each pre-modification record included in a first list and each post-modification record included in a second list for which the pre-modification record and the post-modification record have equal values for at least one unique identifier field, wherein the first list comprises records included in a set of records before at least one modification to the set of records, and wherein the second list comprises records included in the set of records after the at least one modification to the set of records:

(a) if the pre-modification record includes an index and the post-modification record includes an index corresponding to the same field as the index included in the pre-modification record:

remove information about a first structure pointed to by the pre-modification record from an index included in a target record, the target record stored at the hierarchical database and having the same value as the post-modification record for the at least one unique identifier field, and add information about a second structure pointed to by the post-modification record to the index included in the target record, and (b) if neither the pre-modification record nor the post-modification record includes an index, modify the target record so that the target record contains at least one value included in the post-modification record and not included in the pre-modification record.

19. The computer program product of claim 18, wherein the computer readable program codes are further configured to cause the program to:

for each pre-deletion record included in the first list for which no record included in the second list has the same value as the pre-deletion record for the at least one unique identifier field:

(c) if the pre-deletion record includes an index, remove information about a third structure pointed to by the pre-deletion record from an index included in a record stored at the database and having the same value as the pre-deletion record for the at least one unique identifier field, and (d) if the pre-deletion record does not include an index, delete the record stored at the database and having the same value as the pre-deletion record for the at least one unique identifier field.

20. The computer program product of claim 18, wherein the computer readable program codes are further configured to cause the program to:

for each post-insertion record included in the second list for which no record included in the first list has the same value as the post-insertion record for the at least one unique identifier field:

(e) if the post-insertion record includes an index, add information about a fourth structure pointed to by the post-insertion record to an index included in a record stored at the database and having the same value as the post-insertion record for the at least one unique identifier field, and (f) if the post-insertion record does not include an index, insert at the database a record containing at least one value included in the post-insertion record.

* * * * *